US012800091B2

(12) United States Patent
Deng

(10) Patent No.: US 12,800,091 B2
(45) Date of Patent: Nov. 17, 2026

(54) MOTION SYSTEM

(71) Applicant: SHANGHAI LINGZHUAN TECHNOLOGY CO., LTD., Shanghai (CN)

(72) Inventor: Meimei Deng, Shanghai (CN)

(73) Assignee: SHANGHAI LINGZHUAN TECHNOLOGY CO., LTD., Shanghai (CN)

( * ) Notice: Subject to any disclaimer, the term of this patent is extended or adjusted under 35 U.S.C. 154(b) by 296 days.

(21) Appl. No.: 18/703,885

(22) PCT Filed: Aug. 2, 2023

(86) PCT No.: PCT/CN2023/110859
§ 371 (c)(1),
(2) Date: Apr. 23, 2024

(87) PCT Pub. No.: WO2024/131077
PCT Pub. Date: Jun. 27, 2024

(65) Prior Publication Data

US 2026/0160379 A1 Jun. 11, 2026

(51) Int. Cl.
*F16M 11/12* (2006.01)

(52) U.S. Cl.
CPC .................................. *F16M 11/123* (2013.01)

(58) Field of Classification Search
CPC ....... F16M 11/06; F16M 11/123; F16C 11/04; F24S 30/48
See application file for complete search history.

(56) References Cited

U.S. PATENT DOCUMENTS 11,346,495 B2 * 5/2022 Su .......................... F16M 13/00
2005/0183532 A1 * 8/2005 Najafi .................. B25J 17/0266
74/490.01

(Continued)

FOREIGN PATENT DOCUMENTS

CN 1267587 A 9/2000
CN 210390763 U * 4/2020

(Continued)

OTHER PUBLICATIONS

International Search Report in PCT/CN2023/110859 mailed on Apr. 23, 2024, 7 pages.

(Continued)

*Primary Examiner* — Terrell L Mckinnon
*Assistant Examiner* — Ding Y Tan
(74) *Attorney, Agent, or Firm* — PORUS IP LLC

(57) ABSTRACT

Provided is a motion system, including a first connecting disc, a second connecting disc, and a first motion module, a second motion module and a rotating assembly arranged between the first connecting disc and the second connecting disc. The first motion module and the second motion module are oppositely arranged and are both connected with the rotating assembly. The first motion module includes a first component and a second component connected with each other. Two opposite ends of the first component are rotatably connected with the second connecting disc and one end of the second component, respectively. One end, away from the first component, of the second component is rotatably connected with the rotating assembly. The second motion module includes a third component and a fourth component connected with each other.

18 Claims, 12 Drawing Sheets

(56) References Cited

U.S. PATENT DOCUMENTS

| | | | | |
|---|---|---|---|---|
| 2012/0053701 | A1* | 3/2012 | Yi | B25J 13/04 700/3 |
| 2016/0229556 | A1* | 8/2016 | Zhou | F16M 11/18 |

FOREIGN PATENT DOCUMENTS

| | | | | |
|---|---|---|---|---|
| CN | 115429434 | A * | 12/2022 | F16C 11/12 |
| JP | 2005344757 | A * | 12/2005 | |
| WO | 2023/040229 | A1 | 3/2023 | |

OTHER PUBLICATIONS

Written Opinion in PCT/CN2023/110859 mailed on Apr. 23, 2024, 8 pages.

* cited by examiner

MOTION SYSTEM

CROSS-REFERENCE TO RELATED APPLICATION

This application is a national stage application of International Patent Application No. PCT/CN2023/110859, filed on Aug. 2, 2023, entitled "MOTION SYSTEM", which is incorporated herein by reference in its entirety.

TECHNICAL FIELD

The present disclosure relates to the technical field of motion systems, and in particular to a rotary motion system.

BACKGROUND

A joint is a pivot support that allows an object to rotate around an axis. A set of three joints, mounted on top of the other with orthogonal pivots, allows an object mounted on the innermost joint to be rotation independent of the bracket of the joint. In FIG. 19, the traditional joint has platform rotation axes X, Y and Z. The rotation of the platform in X, Y and Z is achieved by three vertical joint rotation A, B and C. This is a traditional orthogonal joint.

However, the payload of the cardan joint is limited due to the long arm of the cardan joint. In addition, in some platform directions, as shown in FIG. 20, the cardan joint blocks the field of view of the payload on the platform, which is related to the application of radars, video cameras, and cameras.

The embodiments aim to provide a cardan joint with a non-orthogonal cardan joint axis, and an angle $\alpha$ thereof is between 0° and 90°, as shown in FIG. 21, so as to alleviate these shortcomings. The angle $\alpha$ is defined as the angle between the axes of the cardan joint rotation A and B and the axis of the vertical C. The 90°-angle $\alpha$ represents the traditional orthogonal cardan joint. The rotation of the platform around the axes X and Y is achieved through composite rotation A and B of the non-orthogonal arm of the cardan joint. A and B can rotate to any angle, but the rotation of the platform around X and Y will never exceed twice the angle $\alpha$.

In many applications, high positional accuracy, range control and high payload weight and volume are more important than working range, and non-orthogonal cardan joints are more popular than traditional orthogonal cardan joints. The shorter arm of the cardan joint can achieve higher payload weight and volume capacity.

As described in the patent PCT/CN 2022/082279 (WO2023040229A1), a non-orthogonal cardan joint is developed from a rotary joint with two rotating components, which can slide by tilting at an angle of $\alpha$. The payload rotates around an origin O, depending on the controlled rotation of the rotating components, as shown in FIG. 22A. The virtual rotation origin O is defined by the intersection of rotation axes of two rotating components, and can be changed by configuring the rotation axes of the rotating components, as shown in FIG. 22B. FIG. 22C and FIG. 22B are actually the same, but the rotating components are replaced by arms and joints. FIG. 22C represents a non-orthogonal cardan joint with an angle of $\alpha$.

In the U.S. Pat. No. 11,346,495B2, a control system for a non-orthogonal cardan joint is described. The control system is used as a stabilization system for a video camera and video equipment. However, in other applications, non-orthogonal cardan joints are very rare.

SUMMARY

In order to solve one or more technical problems in the prior art, a motion system is provided by embodiments of the present disclosure.

In order to achieve the objective above-mentioned, the technical solutions adopted by the present disclosure for solving the technical problem are as follows.

A motion system is provided, including a first connecting disc, a second connecting disc, and a first motion module, a second motion module and a rotating assembly arranged between the first connecting disc and the second connecting disc.

The first motion module and the second motion module are oppositely arranged and are both connected with the rotating assembly.

The first motion module includes a first component and a second component which are connected with each other, two opposite ends of the first component are rotatably connected with the second connecting disc and one end of the second component, respectively. One end, away from the first component, of the second component is rotatably connected with the rotating assembly.

The second motion module includes a third component and a fourth component which are connected with each other, two opposite ends of the third component are rotatably connected with the second connecting disc and one end of the fourth component, respectively. One end, away from the third component, of the fourth component is rotatably connected with the rotating assembly.

In a specific embodiment, the rotating assembly includes a first connecting shaft, and a first insert bearing with housing and a second insert bearing with housing which are sleeved on the first connecting shaft.

The first connecting disc is sleeved on the first connecting shaft, and located above the first insert bearing with housing and the second insert bearing with housing.

One end, away from the first component, of the second component is sleeved on the first connecting shaft and connected with an outer ring of the first insert bearing with housing.

One end, away from the third component, of the fourth component is sleeved on the first connecting shaft and connected with an outer ring of the second insert bearing with housing.

In a specific embodiment, the first motion module further includes a first connecting mechanism. The first connecting mechanism includes a second connecting shaft, and a third insert bearing with housing and a fourth insert bearing with housing which are sleeved on the second connecting shaft.

One end, adjacent to the first component, of the second component is sleeved on the second connecting shaft and is connected with an outer ring of the third insert bearing with housing.

One end, adjacent to the second component, of the first component is sleeved on the second connecting shaft and is connected with an outer ring of the fourth insert bearing with housing.

In a specific embodiment, the first motion module further includes a second connecting mechanism. The second connecting mechanism includes a third connecting shaft, and a fifth insert bearing with housing sleeved on the third connecting shaft.

One end, away from the second component, of the first component is sleeved on the third connecting shaft and is connected with an outer ring of the fifth insert bearing with housing.

One end, adjacent to the first component, of the second connecting disc is sleeved on the third connecting shaft.

In a specific embodiment, the second motion module further includes a third connecting mechanism. The third connecting mechanism includes a fourth connecting shaft, and a sixth insert bearing with housing and a seventh insert bearing with housing which are sleeved on the fourth connecting shaft.

One end, adjacent to the third component, of the fourth component is sleeved on the fourth connecting shaft and is connected with an outer ring of the sixth insert bearing with housing.

One end, adjacent to the fourth component, of the third component is sleeved on the fourth connecting shaft and is connected with an outer ring of the seventh insert bearing with housing.

In a specific embodiment, the second motion module further includes a fourth connecting mechanism. The fourth connecting mechanism includes a fifth connecting shaft, and an eighth insert bearing with housing sleeved on the fifth connecting shaft.

One end, away from the fourth component, of the third component is sleeved on the fifth connecting shaft and is connected with an outer ring of the eighth insert bearing with housing.

One end, adjacent to the third component, of the second connecting disc is sleeved on the fifth connecting shaft.

In a specific embodiment, the rotating assembly includes a gear assembly and a first bearing assembly connected with each other.

One end, away from the first component, of the second component is embedded inside the first bearing assembly and is abutted against the gear assembly.

One end, away from the third component, of the fourth component is sleeved outside the first bearing assembly and is abutted against the gear assembly.

In a specific embodiment, the gear assembly includes a gear, and a connector. The gear is connected with the first bearing assembly through the connector.

An outer gear ring in fit with the gear is provided at one end, abutting against the gear assembly, of the second component.

An inner gear ring in fit with the gear is provided at one end, abutting against the gear assembly, of the fourth component.

In a specific embodiment, the first bearing assembly includes a first bearing, and a second bearing sleeved on an outer ring of the first bearing.

One end, away from the first component, of the second component is embedded inside an inner ring of the first bearing.

One end, away from the third component, of the fourth component is sleeved outside an outer ring of the second bearing.

The gear is connected with the outer ring of the first bearing and an inner ring of the second bearing through the connector.

In a specific embodiment, the first connecting disc is connected with the outer ring of the first bearing and the inner ring of the second bearing.

In a specific embodiment, the first motion module further includes a first connecting mechanism. The first connecting mechanism includes a second bearing assembly.

One end, adjacent to the first component, of the second component is embedded inside the second bearing assembly.

One end, adjacent to the second component, of the first component is sleeved outside the second bearing assembly.

In a specific embodiment, the first connecting mechanism further includes a first elastic element, and the first elastic element is arranged between the second component and the second bearing assembly.

In a specific embodiment, the first motion module further includes a second connecting mechanism. The second connecting mechanism includes a third bearing assembly.

One end, away from the second component, of the first component is sleeved outside the third bearing assembly.

One end, adjacent to the first component, of the second connecting disc is embedded inside the third bearing assembly.

In a specific embodiment, the second connecting mechanism further includes a second elastic element, and the second elastic element is arranged between the second connecting disc and the third bearing assembly.

In a specific embodiment, the second motion module further includes a third connecting mechanism. The third connecting mechanism includes a fourth bearing assembly.

One end, adjacent to the third component, of the fourth component is embedded inside the fourth bearing assembly.

One end, adjacent to the fourth component, of the third component is sleeved outside the fourth bearing assembly.

In a specific embodiment, the third connecting mechanism further includes a third elastic element, and the third elastic element is arranged between the fourth component and the third bearing assembly.

In a specific embodiment, the second motion module further includes a fourth connecting mechanism. The fourth connecting mechanism includes a fifth bearing assembly.

One end, away from the fourth component, of the third component is sleeved outside the fifth bearing assembly.

One end, adjacent to the third component, of the second connecting disc is embedded inside the fifth bearing assembly.

In a specific embodiment, the fourth connecting mechanism further includes a fourth elastic element. The fourth elastic element is arranged between the second connecting disc and the fifth bearing assembly.

In a specific embodiment, the first elastic element and/or the second elastic element and/or the third elastic element and/or the fourth elastic element include a spring, or a rubber block.

In a specific embodiment, the rotating assembly includes a gear assembly and a first bearing assembly connected with each other.

One end, away from the first component, of the second component is embedded inside the first bearing assembly.

One end, away from the third component, of the fourth component is sleeved outside the first bearing assembly and connected with the gear assembly.

In a specific embodiment, the gear assembly includes an inner gear ring, a gear train meshed with the inner gear ring, and a connector.

The gear train is connected with the first bearing assembly through the connector.

The inner gear ring is fixedly connected with the fourth component.

In a specific embodiment, the gear train includes a center gear, and at least one planetary gear meshed with the center gear.

In a specific embodiment, the first bearing assembly includes a first bearing, and a second bearing sleeved outside an outer ring of the first bearing.

One end, away from the first component, of the second component is embedded inside an inner ring of the first bearing.

One end, away from the third component, of the fourth component is sleeved outside an outer ring of the second bearing.

At least one gear in the gear train is connected with the outer ring of the first bearing and an inner ring of the second bearing through the connector.

In a specific embodiment, the rotating assembly includes a gear assembly and a first bearing assembly connected with each other.

One end, away from the first component, of the second component is embedded inside the first bearing assembly and is connected with the gear assembly.

One end, away from the third component, of the fourth component is sleeved outside the first bearing assembly and is connected with the gear assembly.

In a specific embodiment, the gear assembly includes a first inner gear ring, a second inner gear ring, a gear train meshed with the first inner gear ring and the second inner gear ring, and a connector.

At least one gear in the gear train is connected with the first bearing assembly through the connector.

The first inner gear ring is fixedly connected with the second component and meshed with one gear in the gear train.

The second inner gear ring is fixedly connected with the fourth component and meshed with another gear in the gear train.

In a specific embodiment, the first bearing assembly includes a first bearing, and a second bearing sleeved on an outer ring of the first bearing.

One end, away from the first component, of the second component is embedded inside an inner ring of the first bearing.

One end, away from the third component, of the fourth component is sleeved outside an outer ring of the second bearing.

One gear in the gear train is connected with the outer ring of the first bearing and an inner ring of the second bearing through the connector.

In a specific embodiment, the first connecting disc is connected with the first bearing assembly.

In a specific embodiment, the rotating assembly includes a gear assembly, and two first bearing assemblies.

One end, away from the first component, of the second component is sleeved outside one of the two first bearing assemblies.

One end, away from the third component, of the fourth component is sleeved outside another one of the two first bearing assemblies.

One end, away from the first component, of the second component is abutted against one end, away from the third component, of the fourth component through the gear assembly.

In a specific embodiment, the gear assembly includes a first outer gear ring arranged at one end, away from the first component, of the second component, and a second outer gear ring arranged at one end, away from the third component, of the fourth component.

The first outer gear ring is meshed with the second outer gear ring.

In a specific embodiment, each of the two first bearing assemblies includes a connecting pillar, a first bearing, and a second bearing.

The first bearing and the second bearing are sleeved on the connecting pillar, and inner rings of the first bearing and the second bearing are connected with the connecting pillar.

One end, away from the first component, of the second component, or one end, away from the third component, of the fourth component is sleeved outside the first bearing and the second bearing, and is connected with outer ring of the first bearing and outer rings of the second bearing.

In a specific embodiment, the first connecting disc is connected with the first bearing assembly.

In a specific embodiment, the motion system further includes a first connecting rod assembly, a second connecting rod assembly, and a rotary transmission disc.

A first rotating shaft, around which the first component and the second component rotate relative to each other, is coaxially disposed with the rotary transmission disc, and the rotary transmission disc can rotate relative to the first component and the second component.

One end of the first connecting rod assembly is connected with the rotary transmission disc through a first ball joint, and the other end of the first connecting rod assembly is controlled relative to a position of the rotating shaft between the first component and the second connecting disc.

One end of the second connecting rod assembly is connected with the rotary transmission disc through a second ball joint, and another end of the second connecting rod assembly is connected with the rotating assembly through a third ball joint.

In a specific embodiment, the other end of the second connecting rod assembly is fixed to the second connecting disc.

In a specific embodiment, the motion system further includes a driving disc.

A second rotating shaft, around which the first component and the second component rotate relative to each other, is coaxially disposed with the driving disc, the driving disc is able to rotate relative to the first component and the second connecting disc, and the driving disc is able to be controlled to rotate around a rotating shaft thereof.

The technical solutions provided by the embodiments of the present disclosure have the beneficial effects as follows.

A motion system provided by the embodiment of the present disclosure includes a first connecting disc, a second connecting disc, and a first motion module, a second motion module and a rotating assembly arranged between the first connecting disc and the second connecting disc. The first motion module and the second motion module are oppositely arranged and both connected with the rotating assembly. The first motion module includes a first component and a second component which are connected with each other, and two opposite ends of the first component are rotatably connected with the second connecting disc and one end of the second component, respectively; and one end, away from the first component, of the second component is rotatably connected with the rotating assembly. The second motion module includes a third component and a fourth component connected with each other. Two opposite ends of the third component are rotatably connected with the second connecting disc and one end of the fourth component, respectively; and one end, away from the third component, of the fourth component is rotatably connected with the rotating assembly. By providing the first motion module and the third motion module opposite to each other, the first motion module and the second motion module are enabled to have opposite and asymmetric motion ranges, and the motion system can distribute a load from a supported object to two directions, thereby reducing the first motion module and the stress on the second motion module. Compared with the traditional orthogonal cardan joint rotation system, the motion system provided by the embodiment has a shorter arm, thus improving payload weight and volume capacity, especially in a limited volume or operating space. In other aspects, the motion system also has high positioning accuracy and low motor load caused by external load and vibration.

All products in the embodiment do not need to have all the above-mentioned effects. The motion system provided by the embodiment can be used for non-orthogonal cardan joints, especially the non-orthogonal cardan joints for rotating or supporting purposes. The application includes but is not limited to tripod heads, chairs, cameras, entertainment devices, sports or rehabilitation training equipment, household appliances, industrial robots, automobiles and solar tracking systems.

BRIEF DESCRIPTION OF THE DRAWINGS

To illustrate the technical solution of the embodiments of the present disclosure more clearly, the drawings used for the description of the embodiments of the present disclosure are briefly introduced below. Apparently, the drawings in the following description show merely some embodiments of the present disclosure, and those of ordinary skill in the art may still derive other drawings from these drawings without creative efforts.

DETAILED DESCRIPTION OF THE EMBODIMENTS

To make the objectives, technical solutions and advantages of the present disclosure more clearly, the following clearly and completely describes the technical solutions in the embodiments of the present disclosure with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the scope of protection of the present disclosure.

The solutions of the embodiments of the present disclosure are described specifically below with reference to the drawings.

Embodiment 1

Figure 1:
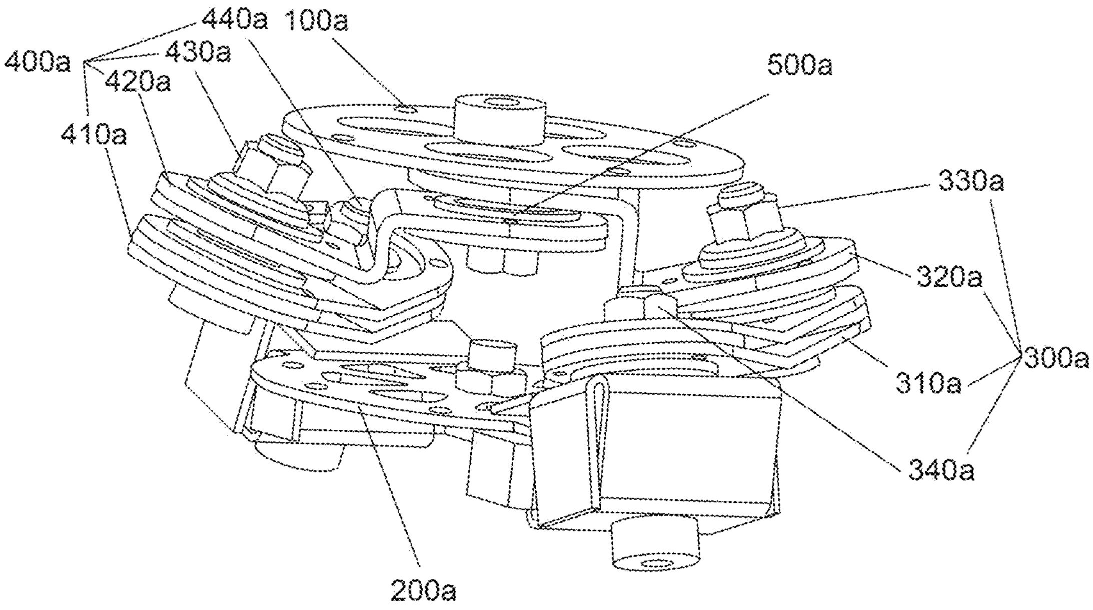
FIG. 1 is a structural schematic diagram of a motion system provided by Embodiment 1 of the present disclosure.
Figure 2:
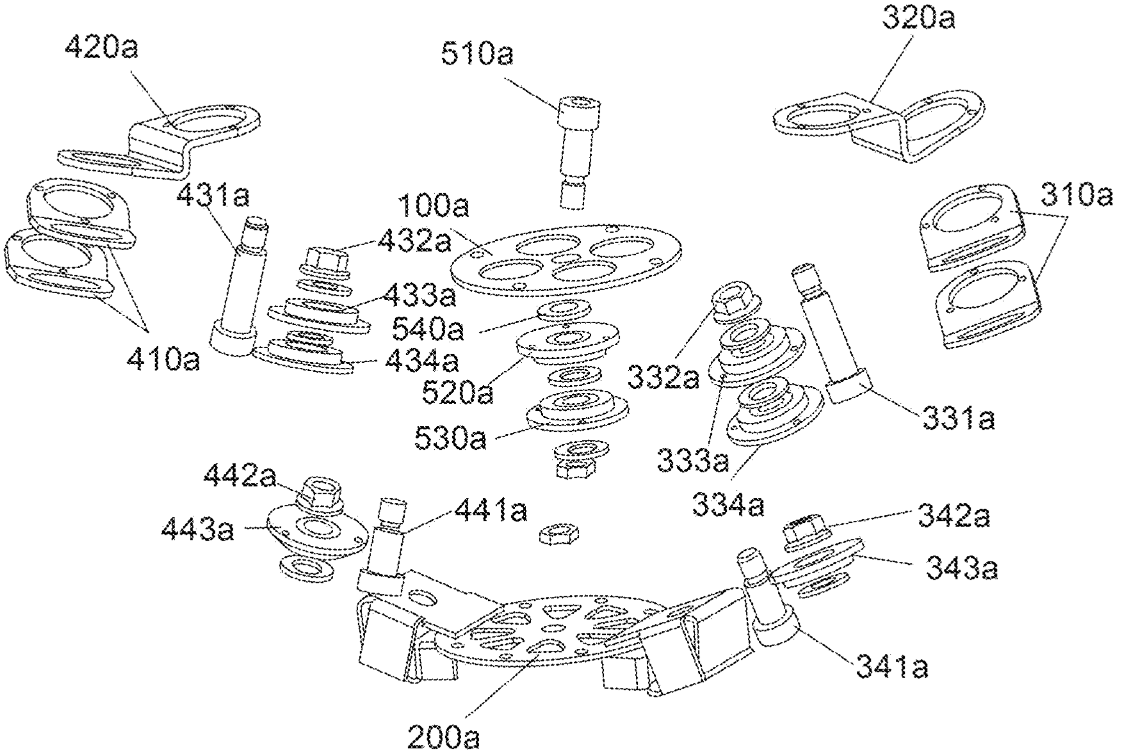
FIG. 2 is an exploded view of the motion system provided by Embodiment 1 of the present disclosure.

Referring to FIG. 1 and FIG. 2, a motion system provided by the embodiment of the present disclosure generally includes a first connecting disc 100*a*, a second connecting disc 200*a*, a first motion module 300*a*, a second motion module 400*a*, and a rotating assembly 500*a*. The first motion module 300*a*, the second motion module 400*a* and the rotating assembly 500*a* are all arranged between the first connecting disc 100*a* and the second connecting disc 200*a*. The first motion module 300*a* and the second motion module 400*a* are connected with one side of the first connecting disc 100*a* through the rotating assembly 500*a*, the other side of the first connecting disc 100*a* is configured for being connected with a supported object, and one side, away from the first connecting disc 100*a*, of the second connecting disc 200*a* is configured for being connected with a supporting device. It should be noted here that in the embodiments of the present disclosure, there are no specific limitations on the connection of the supported object and the supporting device. As an exemplary than nonrestrictive explanation, the supported object may be a chair surface, and correspondingly, the supporting device may be a chair leg.

As a preferred embodiment, in the embodiment of the present disclosure, the first motion module 300*a* and the second motion module 400*a* are oppositely arranged. The first motion module 300*a* and the second motion module 400*a* have opposite motion directions (mainly referring to a rotation direction), and the first motion module 300*a* and the second motion module 400*a* have opposite and asymmetric motion ranges, such that the motion system can distribute a load from the supported object to two directions, thereby reducing the stress on the first motion module 300*a* and the stress on the second motion module 400*a*.

Further, referring to FIG. 1, the first motion module 300*a* includes first components 310*a*, a second component 320*a*, a first connecting mechanism 330*a*, and a second connecting mechanism 340*a*. Two opposite ends of the first component 310*a* are rotatably connected with the second connecting disc 200*a* through the second connecting mechanism 340*a* and one end of the second component 320*a* through the first connecting mechanism 330*a*, respectively. One end, away from the first component 310*a*, of the second component 320*a* is rotatably connected with the rotating assembly 500*a*. Correspondingly, the second motion module 400*a* includes third components 410*a*, a fourth component 420*a*, a third connecting mechanism 430*a*, and a fourth connecting mechanism 440*a*. Two opposite ends of the third component 410*a* are rotatably connected with the second connecting disc 200*a* through the fourth connecting mechanism 440*a* and one end of the fourth component 420*a* through the third connecting mechanism 430*a*, respectively. One end, away from the third component 410*a*, of the fourth component 420*a* is rotatably connected with the rotating assembly 500*a*.

Further, referring to FIG. 2, the rotating assembly 500*a* includes a first connecting shaft 510*a*, a first insert bearing with housing 520*a*, and a second insert bearing with housing 530*a*. Each of the first connecting disc 100*a*, the first insert bearing with housing 520*a* and the second insert bearing with housing 530*a* is provided with a through hole. The first connecting disc 100*a*, the first insert bearing with housing 520*a* and the second insert bearing with housing 530*a* are sleeved on the first connecting shaft 510*a* in sequence from bottom to top through the through holes formed thereon. One end, away from the first connecting disc 100*a*, of the first connecting shaft 510*a* is provided with external threads (not shown in figure), and the first connecting disc 100*a*, the first insert bearing with housing 520*a* and the second insert bearing with housing 530*a* are limited on the first connecting shaft 510*a* by a nut which is threaded to one end, provided with the external threads, of the first connecting shaft 510*a*.

Optionally, the rotating assembly 500*a* may also be provided with multiple spacer 540*a* according to actual demands. Preferably, one spacer 540*a* may be provided between the first connecting disc 100*a* and the first insert bearing with housing 520*a*, one spacer 540*a* may be provided between the first insert bearing with housing 520*a* and the second insert bearing with housing 530*a*, and one spacer 540*a* may be provided between the second insert bearing with housing 530*a* and the nut. A distance is established between the bearings by the spacer, thus making the bearings rotate. Meanwhile, the force area between the components above-mentioned can be increased, thus preventing the surfaces of the first connecting disc 100*a*, the first insert bearing with housing 520*a* and the second insert bearing with housing 530*a* from being damaged and deformed.

It may be understood that each of the first insert bearing with housing 520*a* and the second insert bearing with housing 530*a* includes an inner ring and an outer ring, and the inner ring and the outer ring can rotate relative to each other. The first insert bearing with housing 520*a* and the second insert bearing with housing 530*a* are sleeved on the first connecting shaft 510*a* through the inner rings thereof, and the inner rings are both fixedly connected with the first connecting shaft 510*a*, thus making the outer ring of the first insert bearing with housing 520*a* and the outer ring of the second insert bearing with housing 530*a* can rotate relative to the first connecting shaft 510*a*.

Further, referring to FIG. 2, the first connecting mechanism 330*a* includes a second connecting shaft 331*a*, a first nut 332*a*, a third insert bearing with housing 333*a*, and a fourth insert bearing with housing 334*a*. The third insert bearing with housing 333*a* and the fourth insert bearing with housing 334*a* are respectively sleeved on the second connecting shaft 331*a*, and the first nut 332*a* and the second connecting shaft 331*a* are in cooperative use to limit the third insert bearing with housing 333*a* and the fourth insert bearing with housing 334*a* on the second connecting shaft 331*a*.

Optionally, the second connecting shaft 331*a* includes a screw. Preferably, one spacer may be provided between the first nut 332*a* and the third insert bearing with housing 333*a*, and one spacer may be provided between the third insert bearing with housing 333*a* and the fourth insert bearing with housing 334*a*.

It may be understood that each of the third insert bearing with housing 333*a* and the fourth insert bearing with housing 334*a* includes an inner ring, and an outer ring, and the inner ring and the outer ring can rotate relative to each other. The third insert bearing with housing 333*a* and the fourth insert bearing with housing 334*a* are respectively sleeved on the second connecting shaft 33*la* through the inner rings thereof, and the inner rings are both fixedly connected with the second connecting shaft 331*a*, thus making the outer ring of the third insert bearing with housing 333*a* and the outer ring of the fourth insert bearing with housing 334*a* rotate relative to the second connecting shaft 331*a*.

Further, referring to FIG. 2, the second connecting mechanism 340*a* includes a third connecting shaft 341*a*, a second nut 342*a*, and a fifth insert bearing with housing 343*a*. The fifth insert bearing with housing 343*a* is sleeved on the third connecting shaft 341*a*, and the second nut 342*a* and the third connecting shaft 341*a* are in cooperative use to limit the fifth insert bearing with housing 343*a* on the third connecting shaft 341*a*.

Optionally, the third connecting shaft 341*a* includes a screw. Preferably, a spacer may be provided between a head of the third connecting shaft 341*a* and the fifth insert bearing with housing 343*a*.

It may be understood that the fifth insert bearing with housing 343*a* includes an inner ring and an outer ring, and the inner ring and the outer ring can rotate relative to each other. The fifth insert bearing with housing 343*a* is sleeved on the third connecting shaft 341*a* through the inner ring thereof, and the inner ring is fixedly connected with the third connecting shaft 341*a*, thus making the outer ring of the fifth insert bearing with housing 341*a* rotate relative to the third connecting shaft 341*a*.

Further, referring to FIG. 2, the third connecting mechanism 430*a* includes a fourth connecting shaft 431*a*, a third nut 432*a*, a sixth insert bearing with housing 433*a*, and a seventh insert bearing with housing 434*a*. The sixth insert bearing with housing 433*a* and the seventh insert bearing with housing 434*a* are sleeved on the fourth connecting shaft 431*a*, and the third nut 432*a* and the fourth connecting shaft 431*a* are in cooperative use to limit the sixth insert bearing with housing 433*a* and the seventh insert bearing with housing 434*a* on the fourth connecting shaft 431*a*.

Preferably, one spacer may be provided between the third nut 432*a* and the sixth insert bearing with housing 433*a*, and one spacer may be provided between the sixth insert bearing with housing 433*a* and the seventh insert bearing with housing 434*a*, thus increasing the force area between the components above-mentioned and preventing the surfaces of the sixth insert bearing with housing 433*a* and the seventh insert bearing with housing 434*a* from being damaged and deformed.

It may be understood that each of the sixth insert bearing with housing 433*a* and the seventh insert bearing with housing 434*a* includes an inner ring and an outer ring, and the inner ring and the outer ring can rotate relative to each other. The sixth insert bearing with housing 433*a* and the seventh insert bearing with housing 434*a* are respectively sleeved on the fourth connecting shaft 431*a* through the inner rings thereof, and the inner rings are both fixedly connected with the fourth connecting shaft 431*a*, thus making the outer ring of the sixth insert bearing with housing 433*a* and the outer ring of the seventh insert bearing with housing 434*a* rotate relative to the fourth connecting shaft 431*a*.

Further, referring to FIG. 2, the fourth connecting mechanism 440*a* includes a fifth connecting shaft 441*a*, a fourth nut 442*a*, and an eighth insert bearing with housing 443*a*. The eighth insert bearing with housing 443*a* is sleeved on the fifth connecting shaft 441*a*, and the fourth nut 442*a* and the fifth connecting shaft 441*a* are in cooperative use to limit the eighth insert bearing with housing 443*a* on the fifth connecting shaft 441*a*.

Optionally, the fifth connecting shaft 441*a* includes a screw. Preferably, one spacer may be provided between a head of the fifth connecting shaft 441*a* and the eighth insert bearing with housing 443*a*, thus increasing the force area between the components above-mentioned, and preventing the surface of the eighth insert bearing with housing 443*a* from being damaged and deformed.

It may be understood that the eighth insert bearing with housing 443*a* includes an inner ring and an outer ring, and the inner ring and the outer ring can rotate relative to each other. The eighth insert bearing with housing 443*a* is sleeved on the fifth connecting shaft 441*a* through the inner ring thereof, and the inner ring is fixedly connected with the fifth connecting shaft 441*a*, thus making the outer ring of the eighth insert bearing with housing 443*a* rotate relative to the fifth connecting shaft 441*a*.

Further, referring to FIG. 2, both ends of each of the first component 310*a*, the second component 320*a*, the third component 410*a* and the fourth component 420*a* are provided with through holes. Preferably, the number of the first components 310*a* are two, and the number of the third components 410 are two.

One end, adjacent to the second component 320*a*, of the first component 310*a* is sleeved on the second connecting shaft 331*a* through the through hole formed therein and is connected with the outer ring of the fourth insert bearing with housing 334*a*. One end, away from the second component 320*a*, of the first component 310*a* is sleeved on the third connecting shaft 341*a* through the through hole formed therein and is connected with the outer ring of the fifth insert bearing with housing 343*a*. One end, away from the first component 310*a*, of the second component 320*a* is sleeved on the first connecting shaft 510*a* through the through hole formed therein and is connected with the outer ring of the first insert bearing with housing 520*a*. One end, adjacent to the first component 310*a*, of the second component 320*a* is sleeved on the second connecting shaft 331*a* through the through hole formed therein and is connected with the outer ring of the third insert bearing with housing 333*a*. One end, adjacent to the fourth component 420*a*, of the third component 410*a* is sleeved on the fourth connecting shaft 431*a* through the through hole formed therein and is connected with the outer ring of the seventh insert bearing with housing 434*a*. One end, away from the fourth component 420*a*, of the third component 410*a* is sleeved on the fifth connecting shaft 441*a* through the through hole formed therein and is connected with the outer ring of the eighth insert bearing with housing 443*a*. One end, away from the third component 410*a*, of the fourth component 420*a* is sleeved on the first connecting shaft 510*a* through the through hole formed therein and is connected with the outer ring of the second insert bearing with housing 520*a*. One end, adjacent to the third component 410*a*, of the fourth component 420*a* is sleeved on the fourth connecting shaft 431*a* through the through hole formed therein and is connected with the outer ring of the sixth insert bearing with housing 433*a*. One end, adjacent to the first component 310*a*, of the second connecting disc 200*a* is sleeved on the third connecting shaft 341*a*, and one end, adjacent to the third component 410*a*, of the second connecting disc 200*a* is sleeved on the fifth connecting shaft 441*a*.

It may be understood that through above-mentioned connection modes, one end, adjacent to the second component 320*a*, of the first component 310*a* and one end, adjacent to the first component 310*a*, of the second component 320*a* can rotate relative to the second connecting shaft 331*a* through the fourth insert bearing with housing 334*a* and the third insert bearing with housing 333*a*, respectively. One end, away from the second component 320*a*, of the first component 310*a* can rotate relative to the third connecting shaft 341*a* through the fifth insert bearing with housing 343*a*. One end, away from the first component 310*a*, of the second component 320*a* and one end, away from the third component 410*a*, of the fourth component 420*a* may rotate relative to the first connecting shaft 510*a* through the first insert bearing with housing 520*a* and the second insert bearing with housing 520*a*, respectively. One end, adjacent to the fourth component 420*a*, of the third component 410*a* and one end, adjacent to the third component 410*a*, of the fourth component 420*a* may rotate relative to the fourth connecting shaft 431*a* through the seventh insert bearing with housing 434*a* and the sixth insert bearing with housing 433*a*, respectively. One end, adjacent to the fourth component 420*a*, of the third component 410*a* may rotate relative to the fifth connecting shaft 441*a* through the eighth insert bearing with housing 443*a*.

Embodiment 2

Figure 3:
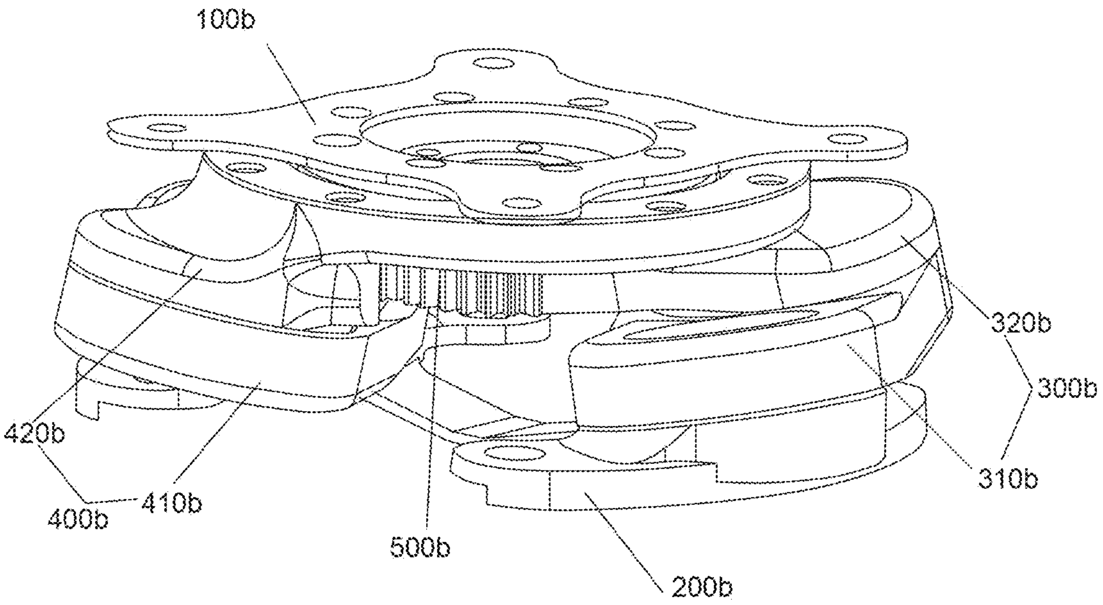
FIG. 3 is a structural schematic diagram of a motion system provided by Embodiment 2 of the present disclosure.

Referring to FIG. 3, a motion system provided by the embodiment of the present disclosure generally includes a first connecting disc 100*b*, a second connecting disc 200*b*, a first motion module 300*b*, a second motion module 400*b*, and a rotating assembly 500*b*. The first motion module 300*b*, the second motion module 400*b* and the rotating assembly 500*b* are arranged between the first connecting disc 100*b* and the second connecting disc 200*b*. The first motion module 300*b* and the second motion module 400*b* are connected with one side of the first connecting disc 100*b* through the rotating assembly 500*b*, the other side of the first connecting disc 100*b* is configured for being connected with a supported object, and one side, away from the first connecting disc 100*b*, of the second connecting disc 200*b* is configured for being connected with a supporting device. It should be noted here that in the embodiment of the present disclosure, there are no specific limitations on the connection of the supported object and the supporting device. As an exemplary than nonrestrictive explanation, the supported object may be a chair surface, and correspondingly, the supporting device may be a chair leg.

As a preferred embodiment, in the embodiment of the present disclosure, the first motion module 300*b* and the second motion module 400*b* are oppositely arranged. The first motion module 300*b* and the second motion module 400*b* have opposite motion directions (mainly referring to a rotation direction), and the first motion module 300*b* and the second motion module 400*b* have opposite and asymmetric motion ranges, such that the motion system can distribute a load from the supported object to two directions, thereby reducing the stress on the first motion module 300*b* and the stress on the second motion module 400*b*.

Figure 4:
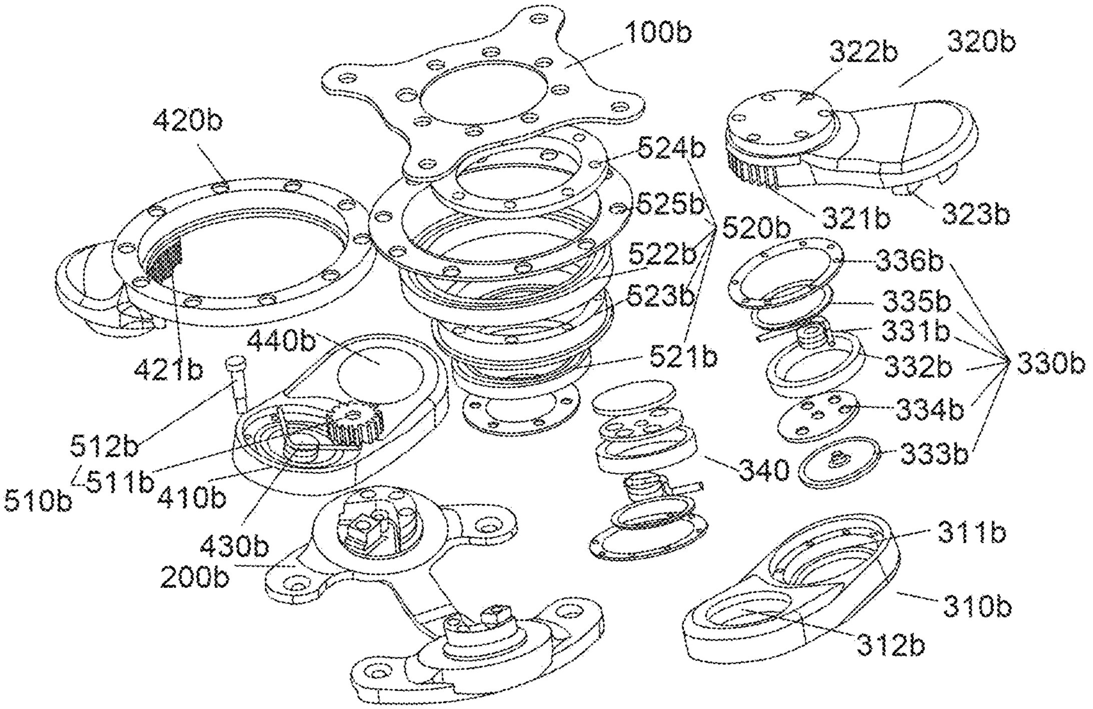
FIG. 4 is an exploded view of the motion system provided by Embodiment 2 of the present disclosure.

Further, referring to FIG. 3 and FIG. 4, the first motion module 300*b* includes a first component 310*b*, a second component 320*b*, a first connecting mechanism 330*b*, and a second connecting mechanism 340*b*. Two opposite ends of the first component 310*b* are rotatably connected with the second connecting disc 200*b* through the second connecting mechanism 340*b* and one end of the second component 320*b* through the first connecting mechanism 330*b*, respectively. One end, away from the first component 310*b*, of the second member 320*b* is rotatably connected with the rotating assembly 500*b*. Correspondingly, the second motion module 400*b* includes a third component 410*b*, a fourth component 420*b*, a third connecting mechanism 430*b*, and a fourth connecting mechanism 440*b*. Two opposite ends of the third component 410*b* are rotatably connected with the second connecting disc 200*b* through the fourth connecting mechanism 440*b* and one end of the fourth component 420*b* through the third connecting mechanism 430*b*, respectively. One end, away from the third component 410*b*, of the fourth component 420*b* is rotatably connected with the rotating assembly 500*b*.

The difference from Embodiment 1 is that, further referring to FIG. 4, in this embodiment of the present disclosure, the rotating assembly 500*b* includes a gear assembly 510*b* and a first bearing assembly 520*b* connected with each other. One end, away from the first component 310*b*, of the second component 320*b* is embedded inside the first bearing assembly 520*b* and is abutted against the gear assembly 510*b*; and one end, away from the third component 410*b*, of the fourth component 420*b* is sleeved outside the first bearing assembly 520*b* and is abutted against the gear assembly 510*b*.

As a preferred embodiment, in the embodiment of the present disclosure, the gear assembly 510*b* includes gears 511*b* and a connector 512*b*. The first bearing assembly 520*b* includes a first bearing 521*b*, a second bearing 522*b*, a first annular element 523*b*, a second annular element 524*b*, and a third annular element 525*b*. It may be understood that each of the first bearing 521*b* and the second bearing 522*b* includes an inner ring and an outer ring, and the inner ring and the outer ring can rotate relative to each other. The second bearing 522*b* is sleeved the outer ring of the first bearing 521*b*, the first annular element 523*b* is arranged between the first bearing 521*b* and the second bearing 522*b*, and is fixedly connected with the outer ring of the first bearing 521*b* and the inner ring of the second bearing 522*b*, respectively. One end, away from the first component 310*b*, of the second component 320*b* is embedded inside the inner ring of the first bearing 521*b*, and one end, away from the third component 410*b*, of the fourth component 420*b* is sleeved outside the outer ring of the second bearing 522*b*, such that one end, away from the first component 310*b*, of the second component 320*b* and one end, away from the third component 410*b*, of the fourth component 420*b* may rotate to opposite directions through the first bearing 521*b* and the second bearing 522*b*. The gear 511*b* is connected with the first annular element 523*b* through the connector 512*b* and the second annular element 524*b*, and thus the gear 511*b* is connected with both the outer ring of the first bearing 521*b* and the inner ring of the second bearing 522*b*. The first connecting disc 100*b* is connected with the first annular element 523*b* through the third annular element 525*b*, and thus the first connecting disc 100*b* is connected with both the outer ring of the first bearing 521*b* and the inner ring of the second bearing 522*b*.

Further, referring to FIG. 4, during specific implementation, one end of the second component 320*b* and one end of the fourth component 420*b* are abutted against the gear 511*b*. One end, abutting against the gear 511*b*, of the second component 320*b* is provided with an outer gear ring 321*b* in fit with the gear 511*b*, and one end, abutting against the gear 511*b*, of the fourth component 420*b* is provided with an inner gear ring 421*b* in fit with the gear 511*b*, thus achieving the meshing of the outer gear ring 321*b*, the inner gear ring 421*b* and the gear 511*b*.

Further, referring to FIG. 4, the first connecting mechanism 330*b* includes a second bearing assembly, and a first elastic element 331*b*. The second connecting mechanism includes a third bearing assembly, and a second elastic element. The third connecting mechanism includes a fourth bearing assembly, and a third elastic element. The fourth connecting mechanism includes a fifth bearing assembly, and a fourth elastic element. One end, adjacent to the first component, of the second component is embedded inside the second bearing assembly, one end, adjacent to the second component, of the first component is sleeved outside the second bearing assembly, and the first elastic element is arranged between the second component and the second bearing assembly. One end, away from the second component, of the first component is sleeved outside the third bearing assembly, one end, adjacent to the first component, of the second connecting disc is embedded inside the third bearing assembly, and the second elastic element is arranged between the second connecting disc and the third bearing assembly. One end, adjacent to the third component, of the fourth component is embedded inside the fourth bearing assembly, one end, adjacent to the fourth component, of the third component is sleeved outside the fourth bearing assembly, and the third elastic element is arranged between the fourth component and the third bearing assembly. One end, away from the fourth component, of the third component is sleeved outside the fifth bearing assembly, one end, adjacent to the third component, of the second connecting disc is embedded inside the fifth bearing assembly, and the fourth elastic element is arranged between the second connecting disc and the fifth bearing assembly.

The first connecting mechanism is taken as an example for illustration, during implementation, the second bearing assembly includes a third bearing 332*b*, a mounting base 333*b*, and optionally includes a mounting spacer 334*b*, a first washer 335*b*, and a second washer 336*b*. The second connecting mechanism 340*b* includes a third bearing assembly and a second elastic element. The third bearing assembly has the same structure and components as the second bearing assembly, and thus will not be repeated one by one here. Two opposite ends of the first component 310*b* are respectively provided with a first mounting hole 311*b* and a second mounting hole 312*b*, and two opposite ends of the second component 320*b* are respectively provided with a first bulge 322*b* and a second bulge 323*b*. The second bearing assembly is arranged in the first mounting hole 311*b*, and the second connecting mechanism 340*b* is arranged in the second mounting hole 312*b*. Specifically, the second bearing assembly is taken as an example for illustration. The mounting base 333*b* is arranged at the bottom of the first mounting hole 311*b*. The mounting spacer 334*b*, the third bearing 332*b*, the first washer 335*b* and the second washer 336*b* are arranged on the mounting base 333*b* in sequence. The first elastic element 331*b* is arranged in the inner ring of the third bearing 332*b*.

During specific implementation, one end, adjacent to the first component 310*b*, of the second component 320*b* is embedded inside the inner ring of the third bearing 332*b*, one end, adjacent to the second component 320*b*, of the first component 310*b* is sleeved outside the outer ring of the third bearing 332*b*, and thus one end, adjacent to the first component 310*b*, of the second component 320*b* and one end, adjacent to the second component 320*b*, of the first component 310*b* can rotate relative to each other through the third bearing 332*b*. One end, away from the second component 320*b*, of the first component 310*b* is sleeved outside the third bearing assembly, and one end, adjacent to the first component 310*b*, of the second connecting disc 200*b* is embedded inside the third bearing assembly, and thus the first component 310*b* and the second connecting disc 200*b* can rotate relative to each other through the third bearing assembly.

As an alternative preferred embodiment, in the embodiment of the present disclosure, the first elastic element 331*b* and the second elastic element are springs. It may be understood that when the first elastic element 331*b* and the second elastic element are springs, the mounting base 333*b* is provided with a boss on which the spring can be sleeved. The first elastic element 331*b* is arranged to provide necessary resistance, so as to keep the center of motion of the motion system.

As another alternative preferred embodiment, in the embodiment of the present disclosure, the first elastic element 331*b* and the second elastic element are rubber blocks. It may be understood that when the first elastic element 331*b* and the second elastic element are rubber blocks, necessary resistance may also be provided to keep the center of motion of the motion system.

As a preferred embodiment, in the embodiment of the present disclosure, the third connecting mechanism and the fourth connecting mechanism of the second motion module have the same structures and components as the first connecting mechanism and the second connecting mechanism of the first motion module, and the third component has the completely same structure as the first component. Related contents can refer to the above and will not be repeated one by one here.

It may be understood that one end, adjacent to the third component 410*b*, of the fourth component 420*b* is embedded inside the fourth bearing assembly. One end, adjacent to the fourth component 420*b*, of the third component 410*b* is sleeved outside the fourth bearing assembly, and thus one end, adjacent to the third component 410*b*, of the fourth component 420*b* and one end, adjacent to the fourth component 420*b*, of the third component 410*b* can rotate relative to each other through the fourth bearing assembly. One end, away from the fourth component 420*b*, of the third component 410*b* is sleeved outside the fifth bearing assembly, one end, adjacent to the third component 410*b*, of the second connecting disc 200*b* is embedded inside the fifth bearing assembly, and thus the third component 410*b* and the second connecting disc 200*b* can rotate relative to each other through the fifth bearing assembly.

Embodiment 3

Figure 5:
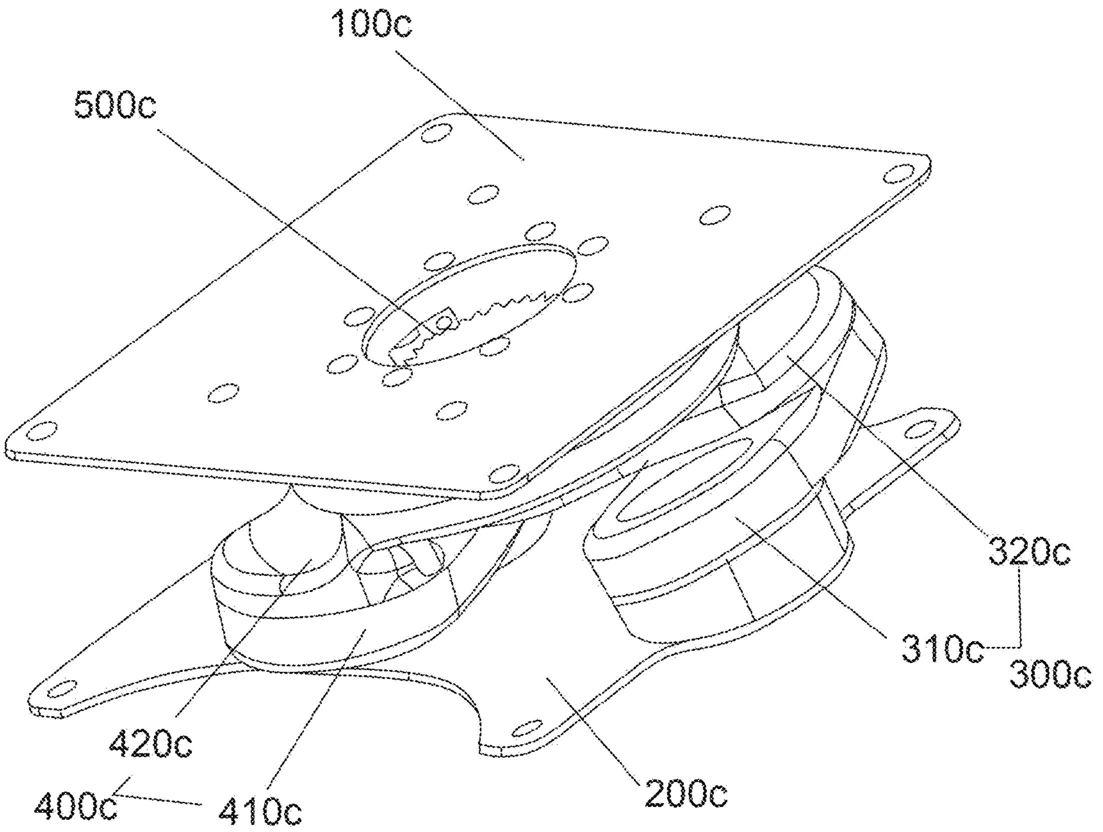
FIG. 5 is a structural schematic diagram of a motion system provided by Embodiment 3 of the present disclosure.

Referring to FIG. 5, a motion system provided by the embodiment of the present disclosure generally includes a first connecting disc 100*c*, a second connecting disc 200*c*, a first motion module 300*c*, a second motion module 400*c*, and a rotating assembly 500*c*. The first motion module 300*c*, the second motion module 400*c* and the rotating assembly 500*c* are arranged between the first connecting disc 100*c* and the second connecting disc 200*c*. The first motion module 300*c* and the second motion module 400*c* are connected with one side of the first connecting disc 100*c* through the rotating assembly 500*c*, the other side of the first connecting disc 100*c* is configured for being connected with a supported object, and one side, away from the first connecting disc 100*c*, of the second connecting disc 200*c* is configured for being connected with a supporting device. It should be noted here that in the embodiment of the present disclosure, there are no specific limitations on the connection of the supported object and the supporting device. As an exemplary than nonrestrictive explanation, the supported object may be a chair surface, and correspondingly, the supporting device may be a chair leg.

As a preferred embodiment, in the embodiment of the present disclosure, the first motion module 300*c* and the second motion module 400*c* are oppositely arranged. The first motion module 300*c* and the second motion module 400*c* have opposite motion directions (mainly referring to a rotation direction), and the first motion module 300*c* and the second motion module 400*c* have opposite and asymmetric motion ranges, such that the motion system can distribute a load from the supported object to two directions, thereby reducing the stress on the first motion module 300*c* and the stress on the second motion module 400*c*.

Figure 6:
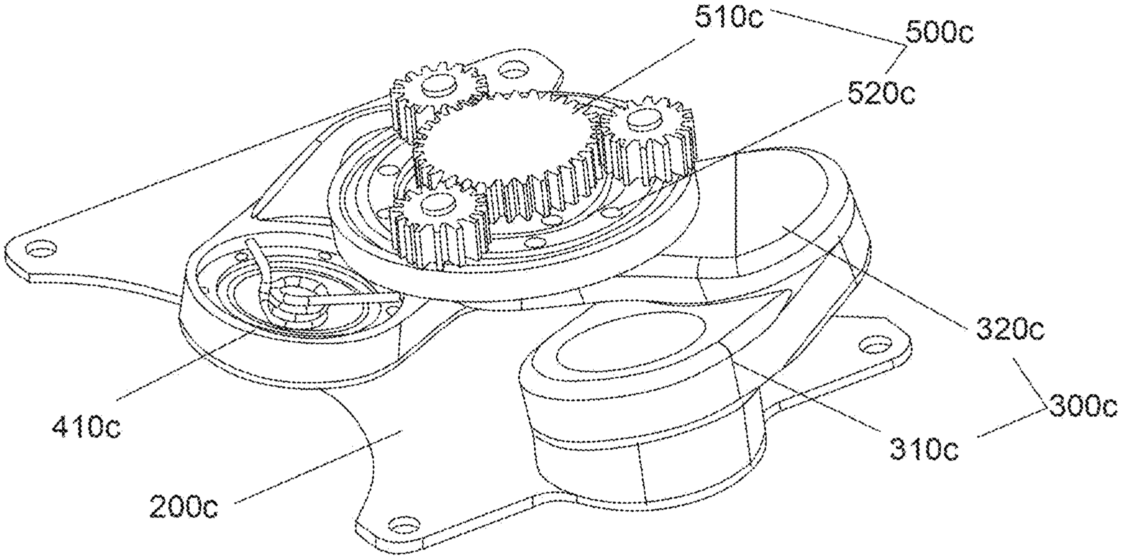
FIG. 6 is a partial structural schematic diagram of the motion system provided by Embodiment 3 of the present disclosure.

Further, referring to FIG. 5 and FIG. 6, the first motion module 300*c* includes a first component 310*c*, a second component 320*c*, a first connecting mechanism 330*c*, and a second connecting mechanism 340*c*. Two opposite ends of the first component 310*c* are rotatably connected with the second connecting disc 200*c* through the second connecting mechanism 340*c* and one end of the second component 320*c* through the first connecting mechanism 330*c*, respectively. One end, away from the first component 310*c*, of the second component 320*c* is rotatably connected with the rotating assembly 500*c*. Correspondingly, the second motion module 400*c* includes a third component 410*c*, a fourth component 420*c*, a third connecting mechanism 430*c*, and a fourth connecting mechanism 440*c*. Two opposite ends of the third component 410*c* are rotatably connected with the second connecting disc 200*c* through the fourth connecting mechanism 440*c* and one end of the fourth component 420*c* through the third connecting mechanism 430*c*, respectively. One end, away from the third component 410*c*, of the fourth component 420*c* is rotatably connected with the rotating assembly 500*c*.

The difference from Embodiment 2 is that an outer gear ring is no longer provided at one end, away from the first component 310*c*, of the second component 320*c*, and an inner gear ring is no longer provided at one end, away from the third component 410*c*, of the fourth component 420*c*.

Figure 7:
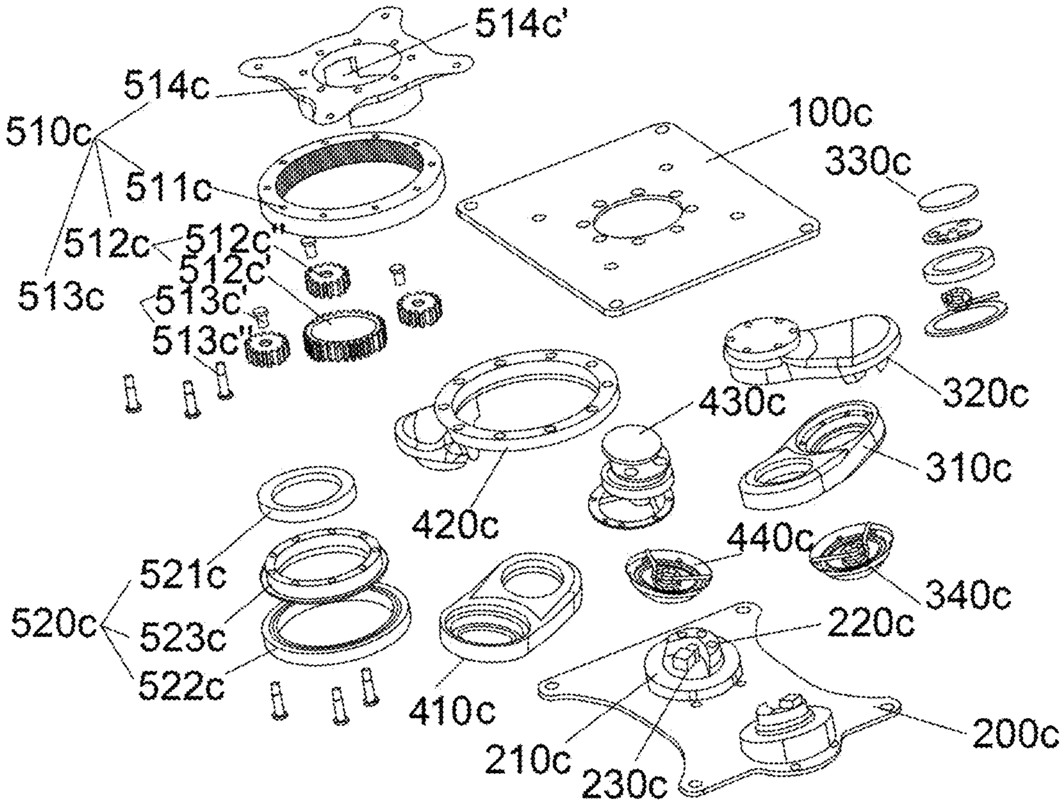
FIG. 7 is an exploded view of the motion system provided by Embodiment 3 of the present disclosure.

Further, referring to FIG. 6 and FIG. 7, in the specific embodiment of the present disclosure, the rotating assembly 500*c* includes a gear assembly 510*c* and a first bearing assembly 520*c* connected with each other. One end, away from the first component 310*c*, of the second component 320*c* is embedded inside the first bearing assembly 520*c*, and one end, away from the third component 410*c*, of the fourth component 420*c* is sleeved outside the first bearing assembly 520*c*.

As a preferred embodiment, in the embodiment of the present disclosure, the gear assembly 510*c* includes an inner gear ring 511*c*, a gear train 512*c*, a connector 513*c*, and a mounting sleeve 514*c*. The inner gear ring 511*c* is meshed with the gear train 512c, the gear train 512c is connected with the first bearing assembly 520c through the connector 513c, and the mounting sleeve 514c is sleeved outside the gear train 512c. The first connecting disc 100c is connected with the mounting sleeve 514c. The first bearing assembly 520c includes a first bearing 521c, a second bearing 522c, and an annular element 523c. It may be understood that each of the first bearing 521c and the second bearing 522c includes an inner ring and an outer ring, and the inner ring and the outer ring can rotate relative to each other. The second bearing 522c is sleeved on the outer ring of the first bearing 521c, the annular element 523c is arranged between the first bearing 521c and the second bearing 522c, and is fixedly connected with the outer ring of the first bearing 521c and the inner ring of the second bearing 522c. One end, away from the first component 310c, of the second component 320c is embedded inside the inner ring of the first bearing 521c, one end, away from the third component 410c, of the fourth component 420c is sleeved outside the outer ring of the second bearing 522c, and thus one end, away from the first component 310c, of the second component 320c, and one end, away from the third component 410c, of the fourth component 420c can rotate to opposite directions through the first bearing 521c and the second bearing 522c. The gear train 512c is connected with the annular element 523c through the connector 513c, and thus the gear train 512c is connected with both the outer ring of the first bearing 521c and the inner ring of the second bearing 522c.

Further, referring to FIG. 7, the gear train 512c includes a center gear 512c' and at least one planetary gear 512c" meshed with the center gear. Illustratively, the number of the planetary gears 512c" is three. A side wall of the mounting sleeve 514c is provided with an opening 514c' corresponding to the planetary gear 512c", so as to facilitate the meshing between the planetary gear 512c" and the inner gear ring 511c. Those skilled in the art may understand that one or more planetary gears can achieve the same function as this exemplary embodiment.

Preferably, the connector 513c includes a first connector 513c' and a second connector 513c" in fit with each other. A connecting hole (not shown in figure) is provided at one end of the first connector 513c', the end with the connecting hole of the first connector 513c' is embedded into the planetary gear 512c", the second connector 513c" is embedded into the annular element 523c, and the connecting hole of the first connector 513c' is sleeved on one end of the second connector 513", thus achieving connection.

Further, referring to FIG. 7, in this embodiment of the present disclosure, the second connecting disc 200c is provided with two connecting seats, and each connecting seat includes a base 210c connected with the second connecting disc 200c, and a protrusion 220c formed by extending in a direction, away from the second connecting disc 200c, of the base 210c, and the protrusion 220c is provided with a mounting groove 230c. One end, away from the fourth component 420c, of the third component 410c and one end, away from the second component 320c, of the first component 310c are sleeved on the protrusion 220c, and the first elastic element and the second elastic element are arranged in the mounting groove 230c. Those skilled in the art may understand that the protrusion 220c may also be mounted and connected by other existing conventional methods or easily conceivable deformation methods.

As a preferred embodiment, in the embodiment of the present disclosure, the first connecting mechanism, the second connecting mechanism, the third connecting mechanism and the fourth connecting mechanism have the same structures and component parts as the first connecting mechanism, the second connecting mechanism, the third connecting mechanism and the fourth connecting mechanism in Embodiment 2, and the first component and the third component have the completely same structures as the first component and the third component in Embodiment 2. Related contents can refer to the above and will not be repeated one by one here.

Embodiment 4

Figure 8:
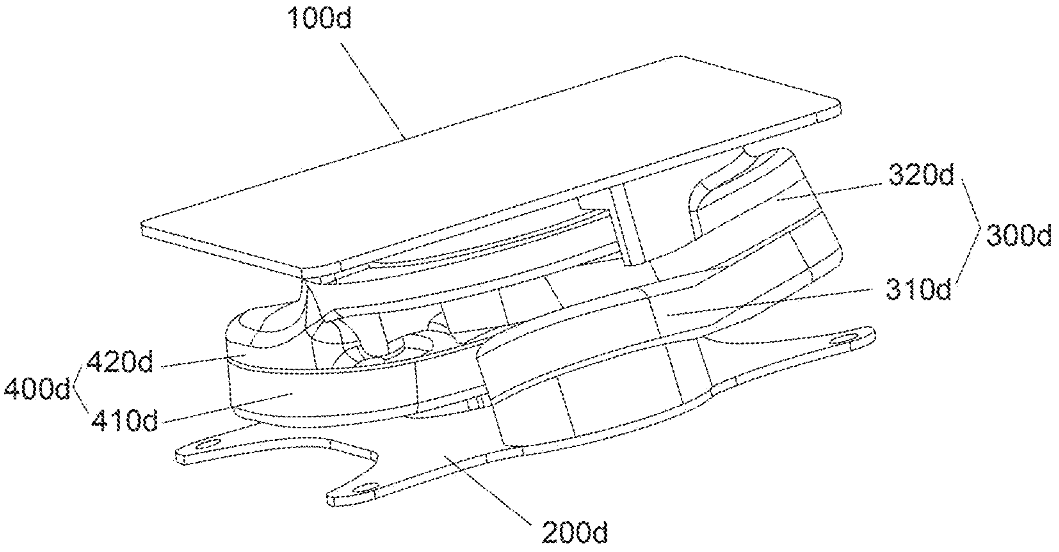
FIG. 8 is a structural schematic diagram of a motion system provided by Embodiment 4 of the present disclosure.

Referring to FIG. 8, a motion system provided by the embodiment of the present disclosure generally includes a first connecting disc 100d, a second connecting disc 200d, a first motion module 300d, a second motion module 400d, and a rotating assembly 500d. The first motion module 300d, the second motion module 400d and the rotating assembly 500d are arranged between the first connecting disc 100d and the second connecting disc 200d. The first motion module 300d and the second motion module 400d are connected with one side of the first connecting disc 100d through the rotating assembly 500d, the other side of the first connecting disc 100d is configured for being connected with a supported object, and one side, away from the first connecting disc 100d, of the second connecting disc 200d is configured for being connected with a supporting device. It should be noted here that in the embodiment of the present disclosure, there are no specific limitations on the connection of the supported object and the supporting device. As an exemplary than nonrestrictive explanation, the supported object may be a chair surface, and correspondingly, the supporting device may be a chair leg.

As a preferred embodiment, in the embodiment of the present disclosure, the first motion module 300d and the second motion module 400d are oppositely arranged. The first motion module 300d and the second motion module 400d have opposite motion directions (mainly referring to a rotation direction), and the first motion module 300d and the second motion module 400d have opposite and asymmetric motion ranges, such that the motion system can distribute a load from the supported object to two directions, thereby reducing the stress on the first motion module 300d and the stress on the second motion module 400d.

Figure 9:
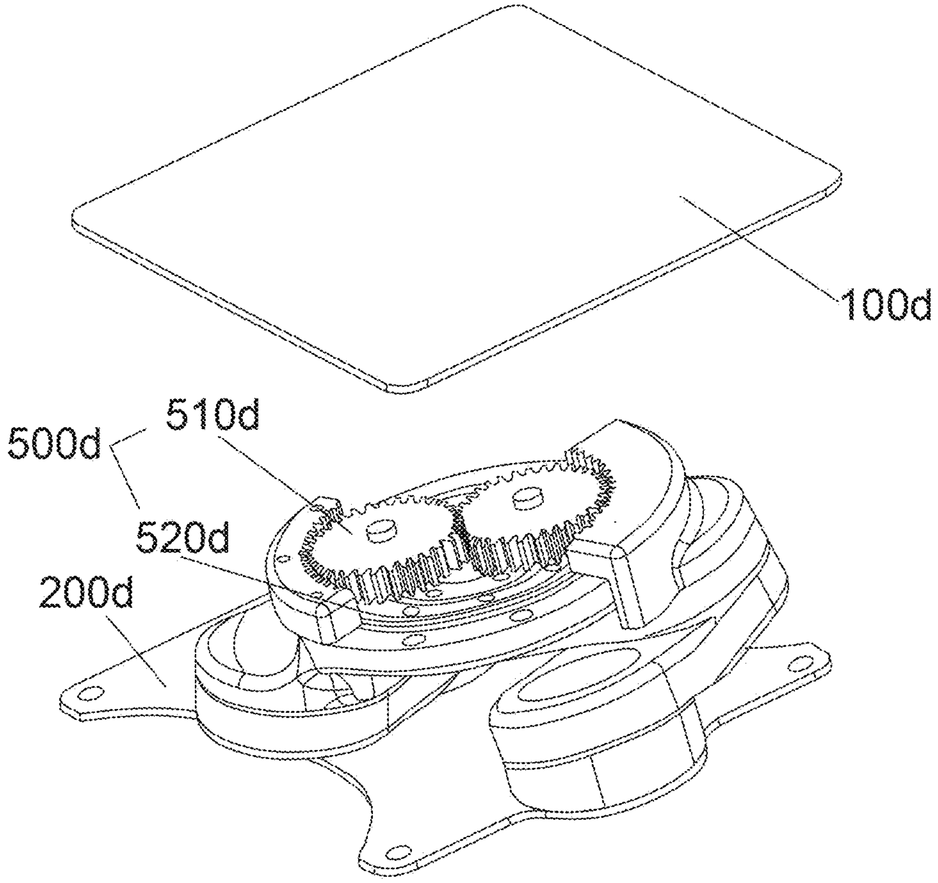
FIG. 9 is a partial structural schematic diagram of the motion system provided by Embodiment 4 of the present disclosure.

Further, referring to FIG. 8 and FIG. 9, the first motion module 300d includes a first component 310d, a second component 320d, a first connecting mechanism 330d, and a second connecting mechanism 340d. Two opposite ends of the first component 310d are rotatably connected with the second connecting disc 200d through the second connecting mechanism 340d and one end of the second component 320d through the first connecting mechanism 330d, respectively. One end, away from the first component 310d, of the second component 320d is rotatably connected with the rotating assembly 500d. Correspondingly, the second motion module 400d includes a third component 410d, a fourth component 420d, a third connecting mechanism 430d, and a fourth connecting mechanism 440d. Two opposite ends of the third component 410d are rotatably connected with the second connecting disc 200d through the fourth connecting mechanism 440d and one end of the fourth component 420d through the third connecting mechanism 430d, respectively. One end, away from the third component 410d, of the fourth component 420d is rotatably connected with the rotating assembly 500d.

Figure 10:
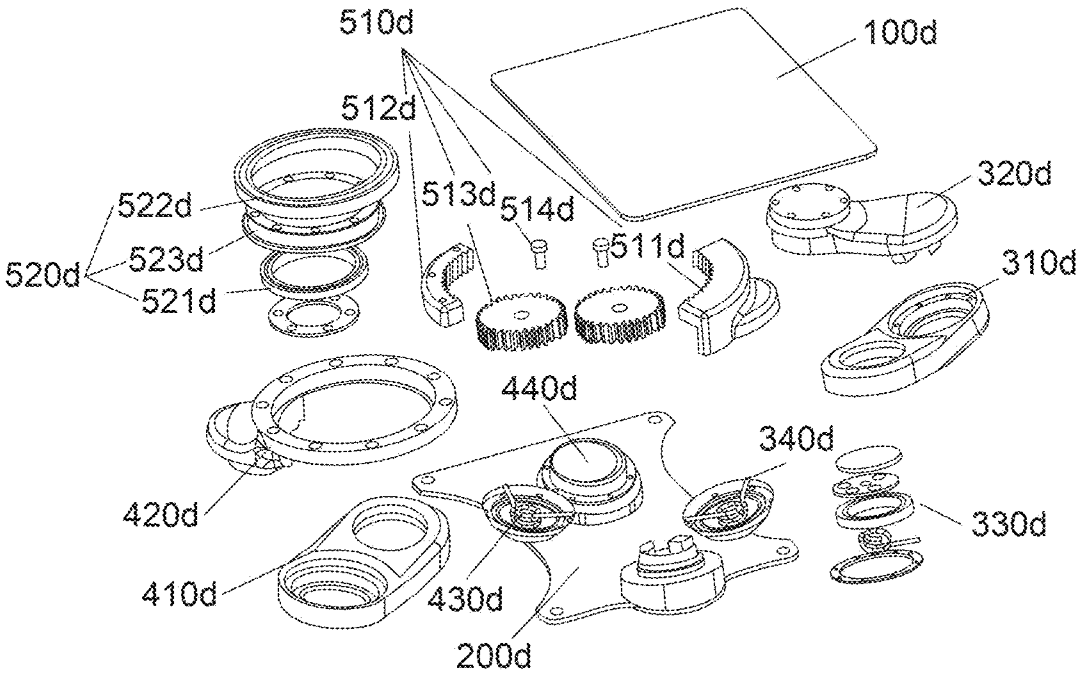
FIG. 10 is an exploded view of the motion system provided by Embodiment 4 of the present disclosure.

The difference from Embodiment 3 is that, further referring to FIG. 9 and FIG. 10, in this embodiment of the present disclosure, the rotating assembly 500d includes a gear assembly 510*d* and a first bearing assembly 520*d* connected with each other. One end, away from the first component 310*d*, of the second component 320*d* is embedded inside the first bearing assembly 520*d*, and one end, away from the third component 410*d*, of the fourth component 420*d* is sleeved outside the first bearing assembly 520*d*.

As a preferred embodiment, in this embodiment of the present disclosure, the gear assembly 510*d* includes a first inner gear ring 511*d*, a second inner gear ring 512*d*, a gear train 513*d*, and a connector 514*d*. The first inner gear ring 511*d* and the second inner gear ring 512*d* are both meshed with the gear train 513*d*, and the gear train 513*d* is connected with the first bearing assembly 520*d* through the connector 514*d*. The first bearing assembly 520*d* includes a first bearing 521*d*, a second bearing 522*d*, and an annular element 523*d*. The first bearing assembly 520 *d* has the same structure as the first bearing assembly 520 *c* in Embodiment 3. Related contents can refer to the above and will not be repeated one by one here. One end, away from the first component 310*d*, of the second component 320*d* is embedded in the inner ring of the first bearing 521*d*, one end, away from the third component 410*d*, of the fourth component 420*d* is sleeved outside the outer ring of the second bearing 522*d*, and thus one end, away from the first component 310*d*, of the second component 320*d* and one end, away from the third component 410*d*, of the fourth component 420*d* can rotate to opposite directions through the first bearing 521*d* and the second bearing 522*d*. The gear train 513*d* is connected with the annular element 523*d* through the connector 514*d*, and thus the gear train 513*d* is connected with both the outer ring of the first bearing 521*d* and the inner ring of the second bearing 522*d*.

Further, referring to FIG. 10, the gear train 513*d* includes two gears meshed with each other, and the two gears are respectively meshed with the first inner gear ring 511*d* and the second inner gear ring 512*d*. The first inner gear ring 511*d* is fixedly connected with the second component 320*d*, and the second inner gear ring 512*d* is fixedly connected with the fourth component 420*d*.

As a preferred embodiment, in this embodiment of the present disclosure, the second connecting disc, the first connecting mechanism, the second connecting mechanism, the third connecting mechanism and the fourth connecting mechanism have the same structures and component parts as those in Embodiment 2, and the first component and the third component have the completely same structures as those in Embodiment 2. The related contents can refer to the above and thus will not be repeated one by one here.

Embodiment 5

Figure 11:
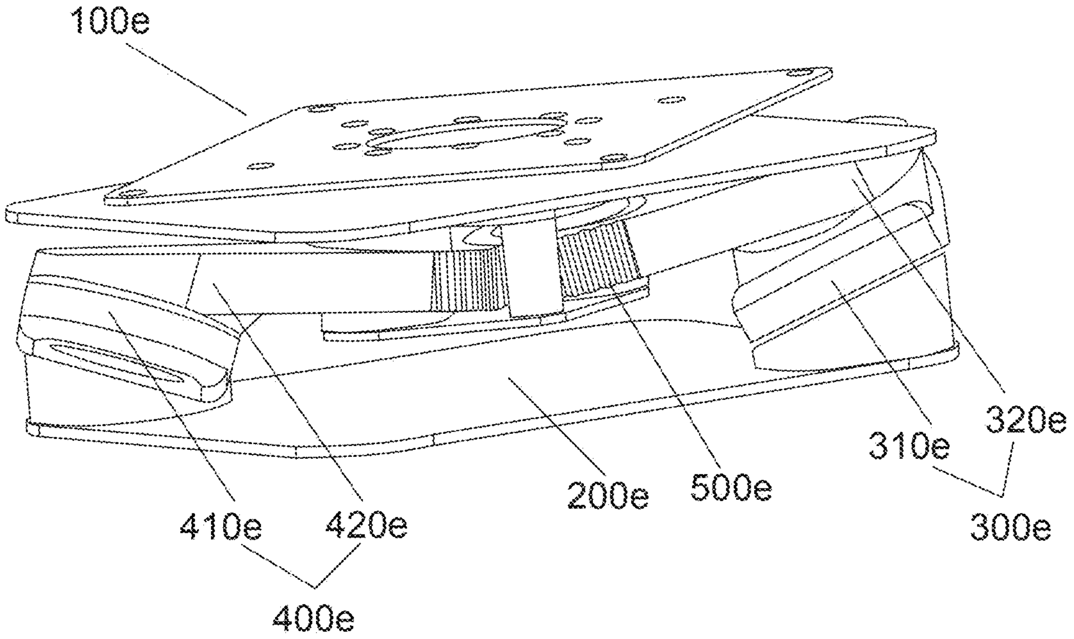
FIG. 11 is a structural schematic diagram of a motion system provided by Embodiment 5 of the present disclosure.

Referring to FIG. 11, a motion system provided by the embodiment of the present disclosure generally includes a first connecting disc 100*e*, a second connecting disc 200*e*, a first motion module 300*e*, a second motion module 400*e*, and a rotating assembly 500*e*. The first motion module 300*e*, the second motion module 400*e* and the rotating assembly 500*e* are arranged between the first connecting disc 100*e* and the second connecting disc 200*e*. The first motion module 300*e* and the second motion module 400*e* are connected with one side of the first connecting disc 100*e* through the rotating assembly 500*e*, the other side of the first connecting disc 100*e* is configured for being connected with a supported object, and one side, away from the first connecting disc 100*e*, of the second connecting disc 200*e* is configured for being connected with a supporting device. It should be noted here that in the embodiment of the present disclosure, there are no specific limitations on the connection of the supported object and the supporting device. As an exemplary than nonrestrictive explanation, the supported object may be a chair surface, and correspondingly, the supporting device may be a chair leg.

As a preferred embodiment, in the embodiment of the present disclosure, the first motion module 300*e* and the second motion module 400*e* are oppositely arranged. The first motion module 300*e* and the second motion module 400*e* have opposite motion directions (mainly referring to a rotation direction), and the first motion module 300*e* and the second motion module 400*e* have opposite and asymmetric motion ranges, such that the motion system can distribute a load from the supported object to two directions, thereby reducing the stress on the first motion module 300*e* and the stress on the second motion module 400*e*.

Figure 12:
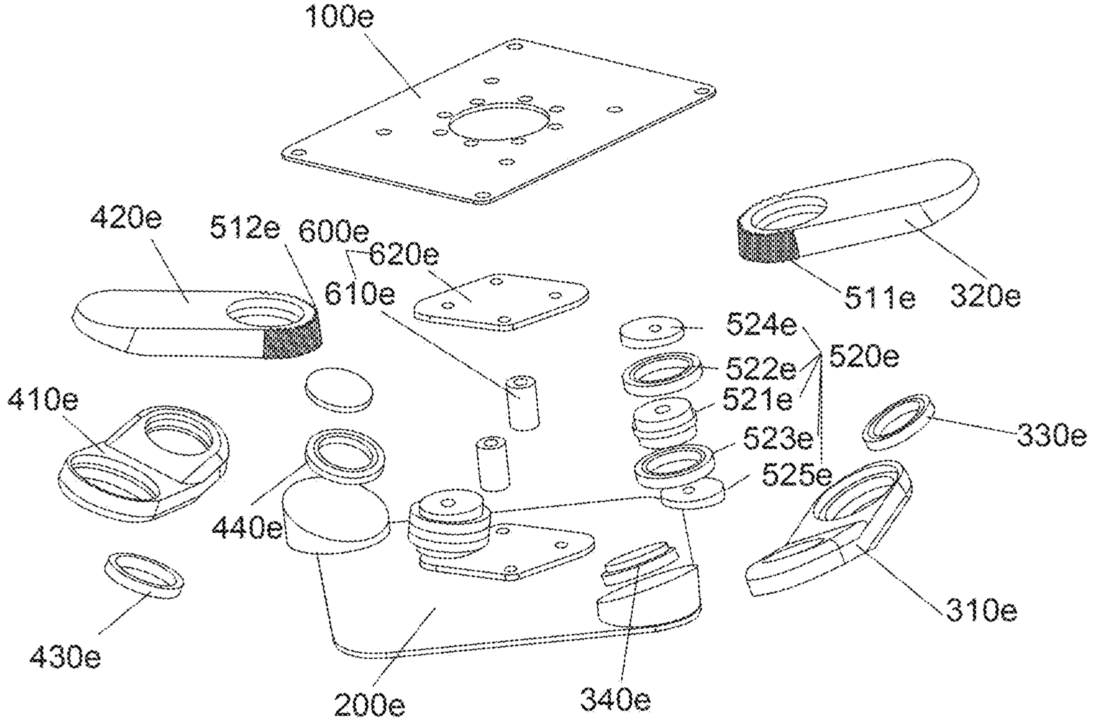
FIG. 12 is an exploded view of the motion system provided by Embodiment 5 of the present disclosure.

Further, referring to FIG. 11 and FIG. 12, the first motion module 300*e* includes a first component 310*e*, a second component 320*e*, a first connecting mechanism 330*e*, and a second connecting mechanism 340*e*. Two opposite ends of the first component 310*e* are rotatably connected with the second connecting disc 200*e* through the second connecting mechanism 340*e* and one end of the second component 320*e* through the first connecting mechanism 330*e*, respectively. One end, away from the first component 310*e*, of the second component 320*e* is rotatably connected with the rotating assembly 500*e*. Correspondingly, the second motion module 400*e* includes a third component 410*e*, a fourth component 420*e*, a third connecting mechanism 430*e*, and a fourth connecting mechanism 440*e*. Two opposite ends of the third component 410*e* are rotatably connected with the second connecting disc 200*e* through the fourth connecting mechanism 440*e* and one end of the fourth component 420*e* through the third connecting mechanism 430*e*, respectively. One end, away from the third component 410*e*, of the fourth component 420*e* is rotatably connected with the rotating assembly 500*e*.

The difference from Embodiment 3 is that, further referring to FIG. 11 and FIG. 12, in this embodiment of the present disclosure, the rotating assembly 500*e* includes a gear assembly, and two first bearing assemblies 520*e*. One end, away from the first component 310*e*, of the second component 320 is sleeved outside one of the first bearing assemblies 520*e*, and one end, away from the third component 410*e*, of the fourth component 420*e* is sleeved outside another filter bearing assembly 520*e*. One end, away from the first component 310*e*, of the second component 320*e* is abutted against one end, away from the third component 410*e*, of the fourth component 420*e* through the gear assembly.

As a preferred embodiment, in the embodiment of the present disclosure, the gear assembly includes a first outer gear ring 51*le*, and a second outer gear ring 512*e*. The first outer gear ring 511*e* is meshed with the second outer gear ring 512*e*. The first outer gear ring 511*e* is arranged at one end, away from the first component 310*e*, of the second component 320*e*, and the second outer gear ring 512*e* is arranged at one end, away from the third component 410*e*, of the fourth component 420*e*. The arrangement of the first outer gear ring 511*e* and the second outer gear ring 512*e* may further limit the motion range of the first motion module and the second motion module.

Further, referring to FIG. 12, each first bearing assembly 520*e* includes a connecting pillar 521*e*, a first bearing 522*e*, a second bearing 523*e*, a first cushion block 524*e*, and a second cushion block 525*e*. The first bearing 522*e* and the second bearing 523*e* are sleeved on the connecting pillar

521*e*, the first cushion block 524*e* and the second cushion block 525*e* are in fit with each other to limit the first bearing 522*e* and the second bearing 523*e* on the connecting pillar 521e. It may be understood that each of the first bearing 522 *e* and the second bearing 523 *e* includes an inner ring and an outer ring, and the inner ring and the outer ring can rotate relative to each other. The first bearing 522*e* and the second bearing 523*e* are sleeved on the connecting pillar 521*e* through inner rings thereof, and the inner rings are both fixedly connected with the connecting pillar 521*e*, thus making the outer ring of the first bearing 522*e* and the outer ring of the second bearing 523*e* rotate relative to the connecting pillar 521*e*. Further, the second component and the fourth component sleeved outside the first bearing assembly can rotate relative to the connecting pillar 521*e*.

Further, referring to FIG. 12, in this embodiment, the motion system further includes a mounting component 600*e*. The mounting component 600*e* includes two supporting pillars 610*e*, and two stop plates 620*e*. The two first bearing assemblies 520*e* and the two supporting pillars 610*e* are fixed between the two stop plates 620*e*, the two first bearing assemblies 520*e* are located at two opposite corners of the stop plate 620*e*, and the two supporting pillars 610*e* are located at another two opposite corners of the stop plates 620*e*. The sides, away from the first bearing assemblies 520*e*, of the two stop plates are connected with the first connecting disc 100*e* and the second connecting disc 200*e*, respectively.

As a preferred embodiment, in this embodiment of the present disclosure, each of the first connecting mechanism 330*e*, the second connecting mechanism 340*e*, the third connecting mechanism 430*e* and the fourth connecting mechanism 440*e* includes a bearing, and the connecting mode between each connecting mechanism and each component may refer to the related content above-mentioned, and thus will not be repeated one by one here.

Embodiment 6

Embodiment 6 of the present disclosure is introduced with reference to FIG. 13 to FIG. 18. Embodiment 6 is a variation of Embodiment 1 or Embodiment 2. Components with the same or similar structure or functions as those in Embodiment 1 or Embodiment 2 are given the same or similar reference numerals, and detailed descriptions of these components are omitted.

The main difference between Embodiment 6 and Embodiment 1 is that the rotation of a first connecting disc 100*f* around its own axis in ω direction is limited.

The main difference between Embodiment 6 and Embodiment 2 is that the limitation of the first connecting disc 100*f* in the ω direction is achieved by means of connecting rod assemblies, instead of the gear assembly 510*b* in Embodiment 2.

It should be noted that the limitation of the rotation of the first connecting disc 100*f* in the ω direction here does not necessarily mean that the first connecting disc 100*f* cannot rotate in the ω direction. In a passive system (i.e., a system without a driving source), the first connecting disc 100*f* may generally be set so as not to rotate in the ω direction. In an active system (i.e., a system with a driving source), the limitation of the rotation of the first connecting disc 100*f* in the @ direction can be manifested that the first connecting disc 100*f* rotates in the ω direction in a controlled manner. For example, the rotation of the first connecting disc 100*f* in the ω direction can be controlled by controlling of either a first motion module 300*f* or a second motion module 400*f* to rotate.

The active system is shown in FIG. 13 to FIG. 17. The system shown in Embodiment 1 is used as a basic system, on the basis of the basic system, the active system further includes a deflection motor M, a driving gear G, a driving disc 800, a rotary transmission disc 700, a first connecting rod assembly 601, and a second connecting rod assembly 602.

The rotary transmission disc 700 and a first connecting member 330*f* are coaxially provided, and the rotary transmission disc 700 can rotate relative to the first connecting member 330*f* and a second member 320*f*. For example, the rotary transmission disc 700 is sleeved on the periphery of the first connecting member 330*f*, a bearing is provided between the rotary transmission disc 700 and the first connecting member 330*f*, and thus the rotation of the rotary transmission disc 700 cannot drive the first connecting member 330*f* and the second member 320*f* to rotate.

The driving disc 800 and a second connecting member 340*f* are coaxially provided, and the driving disc 800 can rotate relative to the first member 310*f* and the second connecting member 340*f*. For example, the driving disc 800 is sleeved on the periphery of the second connecting member 340*f*, a bearing is provided between the driving disc 800 and the second connecting member 340*f*, and thus the rotation of the driving disc 800 cannot drive the second connecting member 340*f* and the first member 310*f* to rotate.

One end of each of the first connecting rod assembly 601 and the second connecting rod assembly 602 is connected with the rotary transmission disc 700, and the first connecting rod assembly 601, the second connecting rod assembly 602 and the rotary transmission disc 700 form a synchronous rotation device.

The other end of the first connecting rod assembly 601 is connected with the driving disc 800, and the other end of the second connecting rod assembly 602 is connected with the rotating assembly 500*f*. Both ends of each of the first connecting rod assembly 601 and the second connecting rod assembly 602 are ball joints. The first connecting rod assembly 601 and the second connecting rod assembly 602 have fixed length. The rotation of the driving disc 800 around its own axis and the rotation of the first connecting disc 100*f* around its own axis can be synchronized through a connecting chain from the driving disc 800, the first connecting rod assembly 601, the rotary transmission disc 700, the second connecting rod assembly 602 and the rotating assembly 500*f* to the first connecting disc 100*f*.

In this embodiment, the periphery of the driving disc 800 is provided with teeth, which are meshed with the driving gear G. The driving gear G is connected with the deflection motor M (without rotating relatively) in a torque-proof manner, the rotation of the deflection motor M is transmitted to the first connecting disc 100*f*, and thus the first connection disc 100*f* is controlled to rotate.

It should be noted that as the system is the active system, for example, a first driving motor M1 configured for driving the first component 310*f* to rotate and a second driving motor M2 configured for driving the second component 320*f* to rotate may be provided to actively control the other two rotational freedom of the 100f, that is, tilt and roll.

It should be understood that in order to control the rotational freedom of the first connecting disc 100*f* around its own axis, the synchronous rotation device including the fist connecting rod 601, the second connecting rod 602 and the rotary transmission disc 700 only needs to be connected with either the first motion module **300*f* or the second motion module 400*f*. In order to control the tilt and rolling freedom of the first connecting disc 100*f*, the first driving motor M1 and the second driving motor M2 only need to be connected with either the first motion module 300*f* or the second motion module 400*f*. Although in this embodiment, the synchronous rotation device, the first driving motor M1 and the second driving motor M2 are all connected with the first motion module 300*f*, but this is not necessary. For example, in other embodiments, the synchronous rotation device may be connected with one of the first motion module 300*f* and the second motion module 400*f*, the first driving motor M1 and the second driving motor M2 may be connected with the other of the first motion module 300*f* and the second motion module 400*f***.

Figure 13:
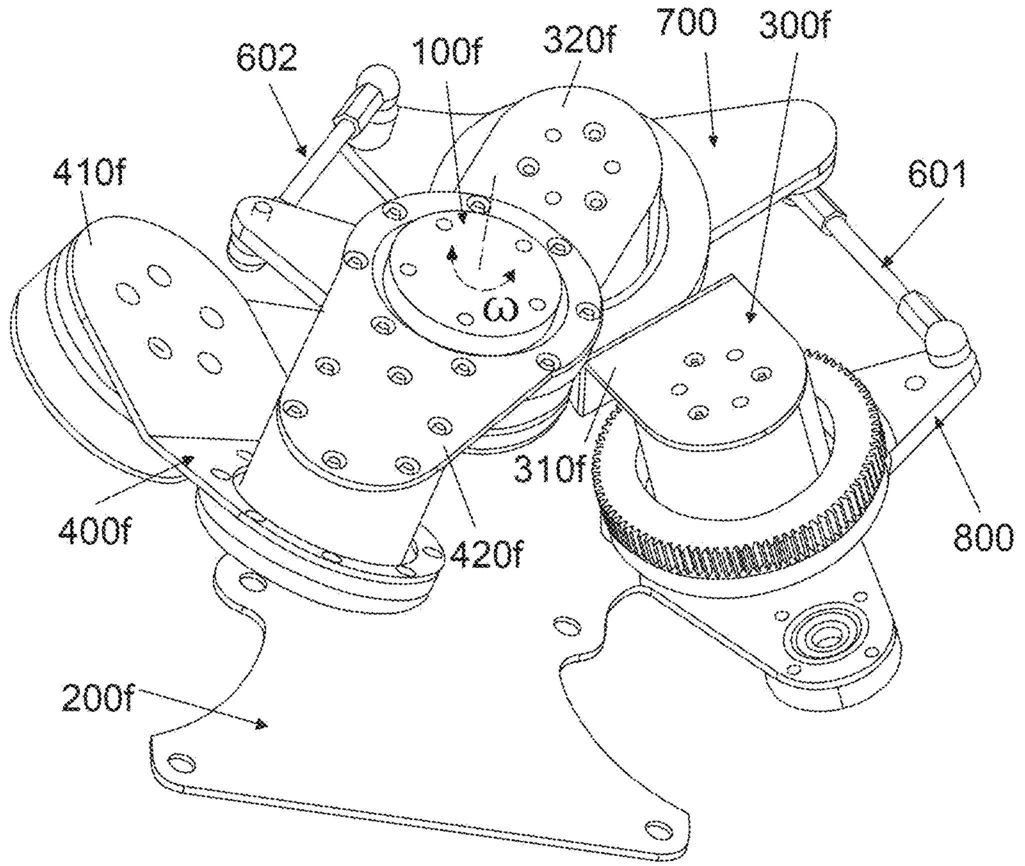
FIG. 13 and FIG. 14 are schematic diagrams of partial structures of an active system provided by Embodiment 6 of the present disclosure.
Figure 14:
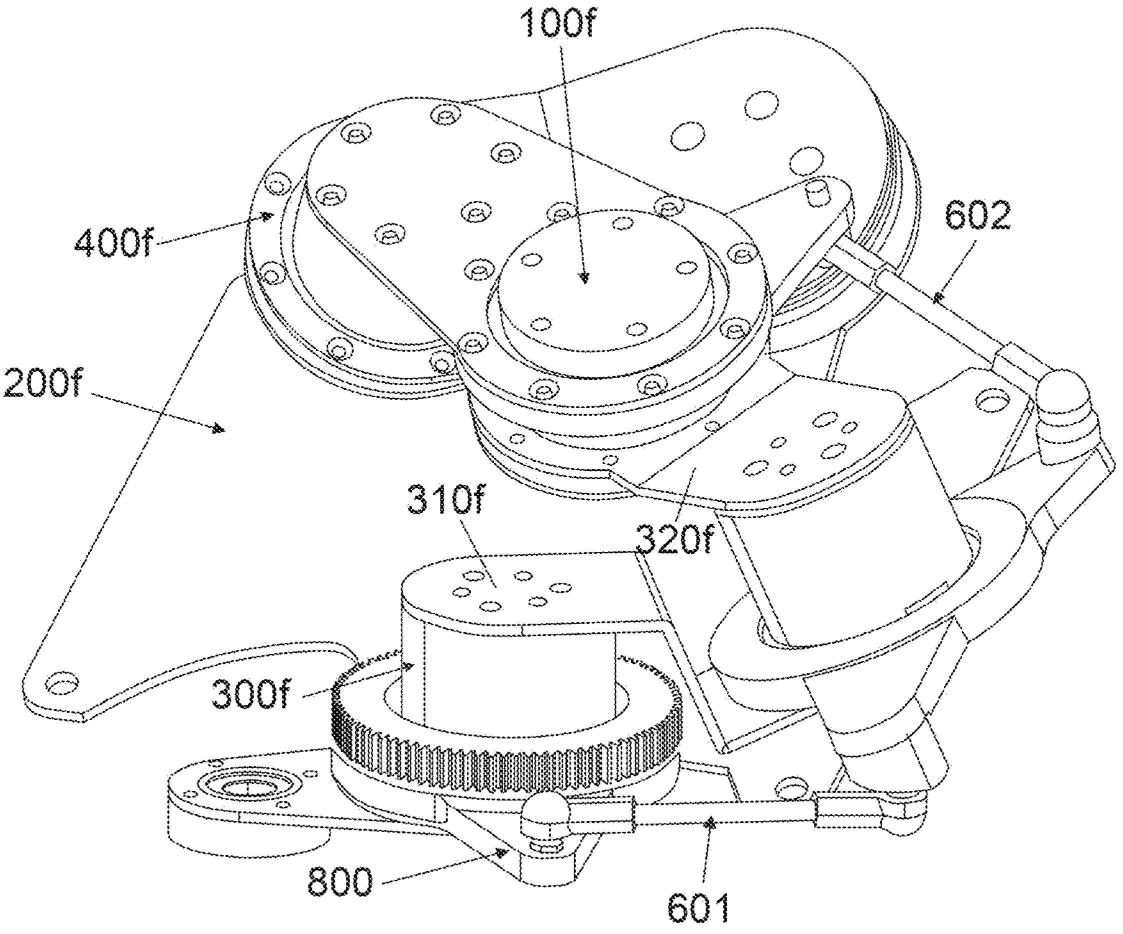
Figure 15:
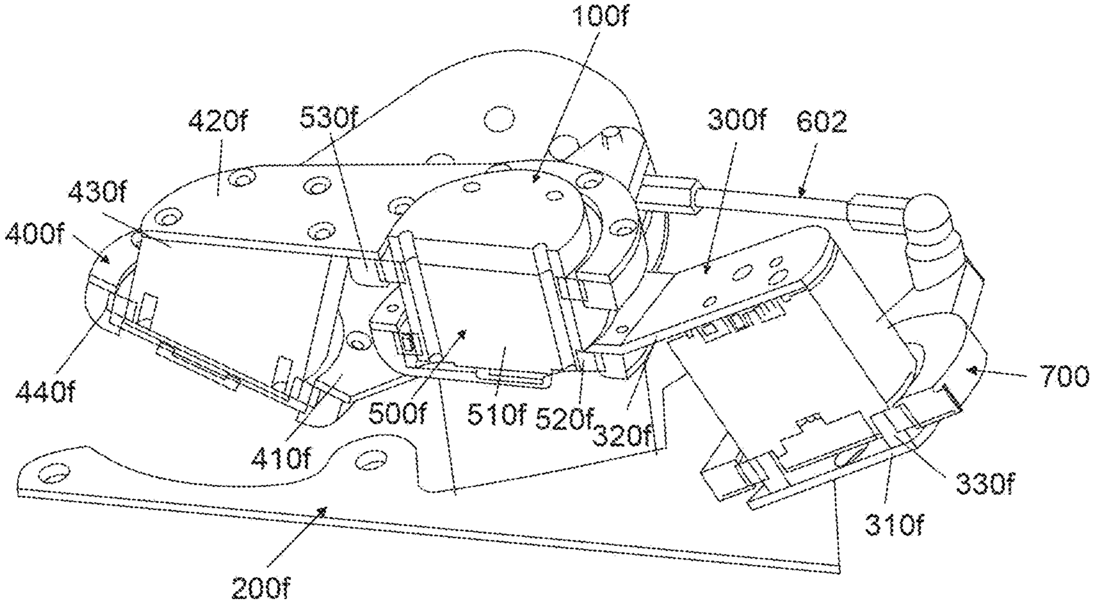
FIG. 15 is a sectional view of an active system provided by Embodiment 6 of the present disclosure.
Figure 16:
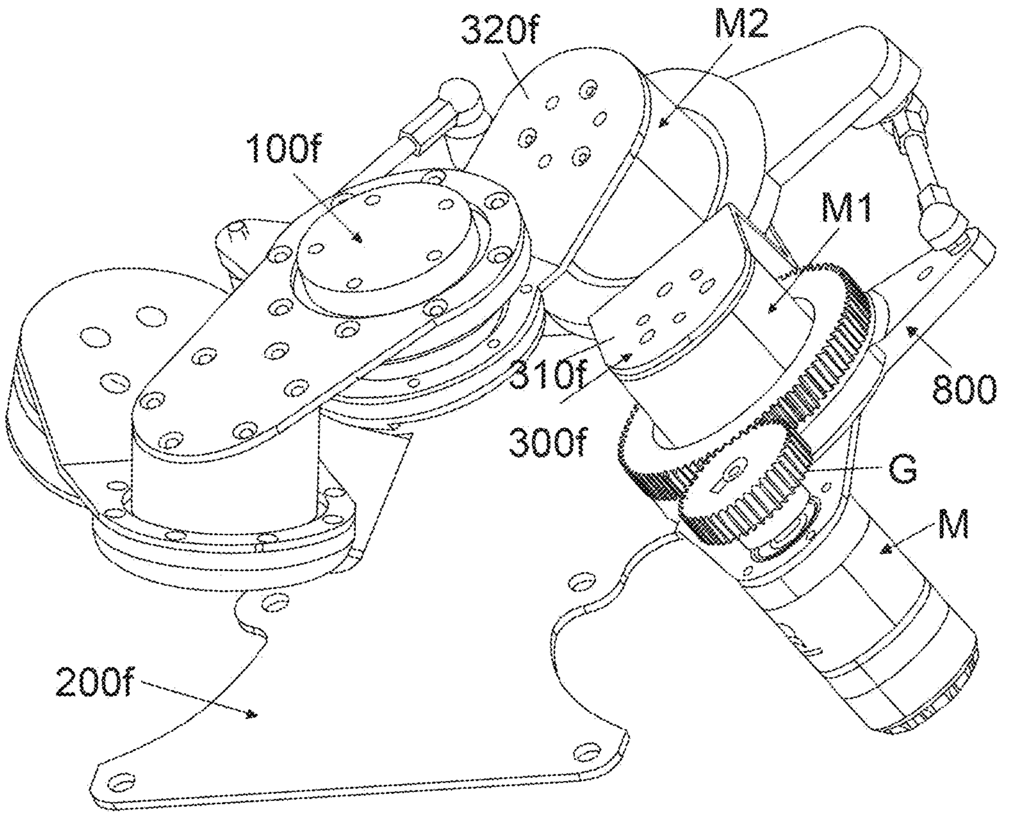
FIG. 16 is a structural schematic diagram of the active system provided by Embodiment 6 of the present disclosure.
Figure 17:
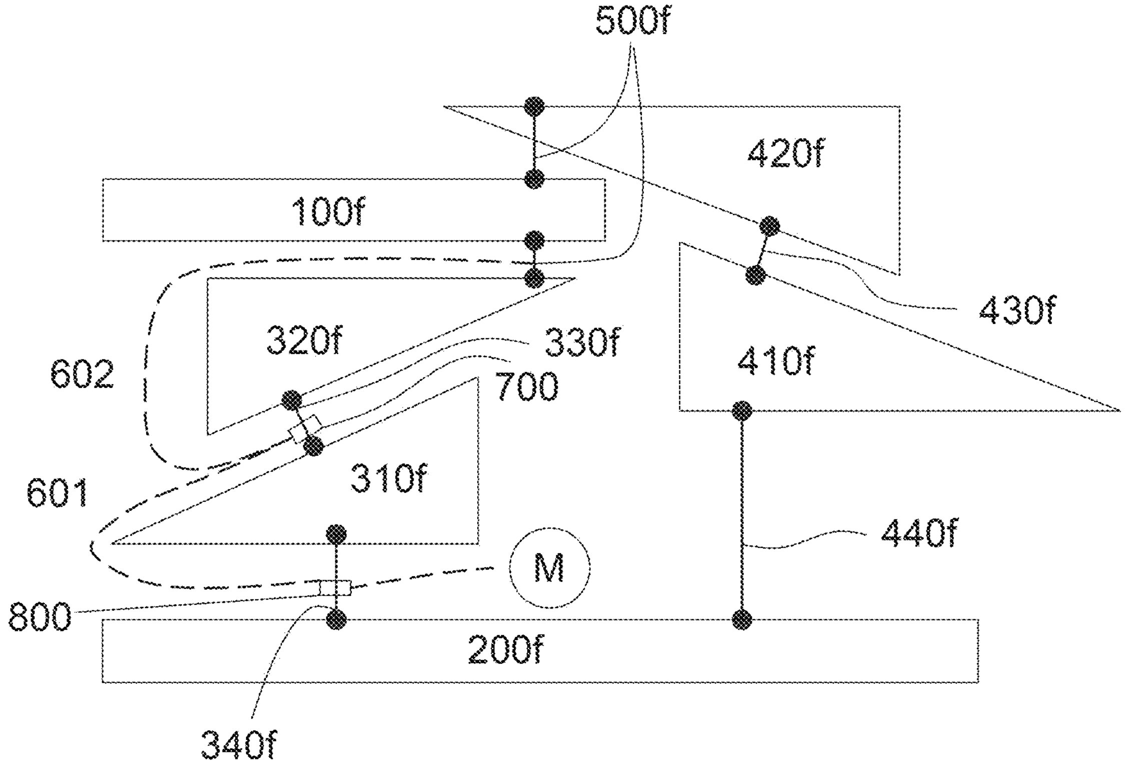
FIG. 17 is a schematic diagram of a partial structure of the active system provided by Embodiment 6 of the present disclosure.

FIG. 17 shows a connection relationship of the main components of the active system corresponding to FIG. 13 with a schematic diagram.

Figure 18:
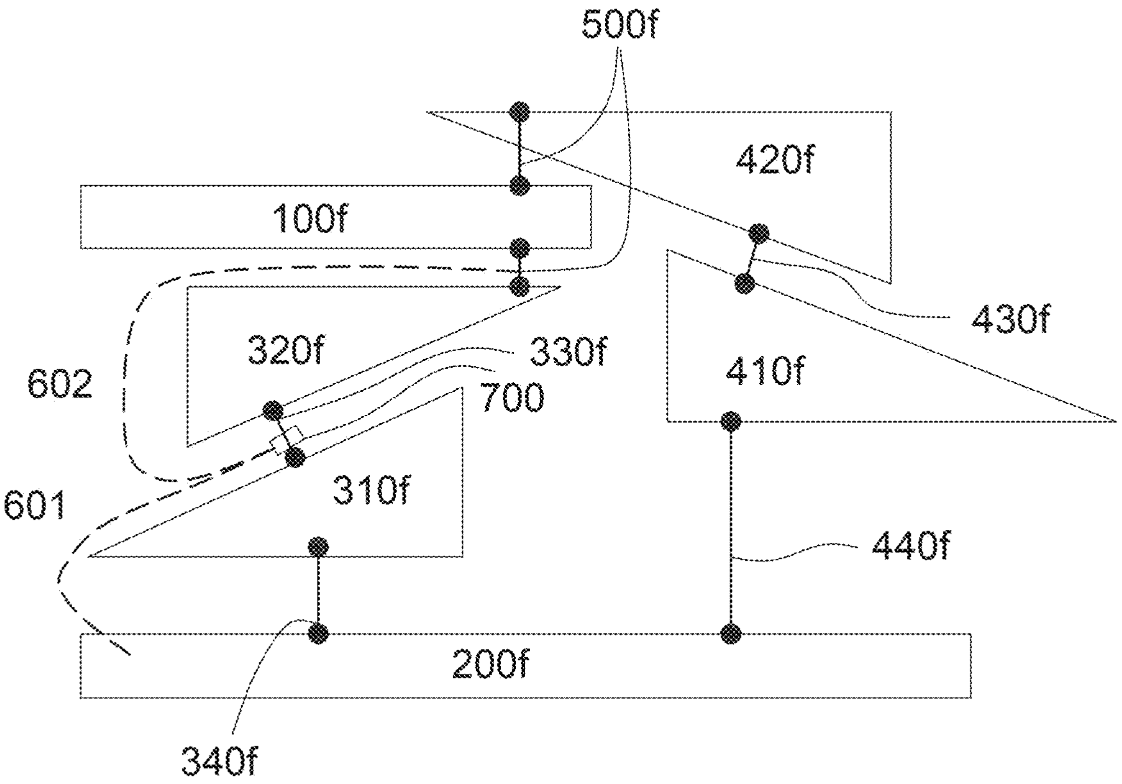
FIG. 18 is a schematic diagram of a partial structure of a passive system provided by Embodiment 6 of the present disclosure.
Figure 19:
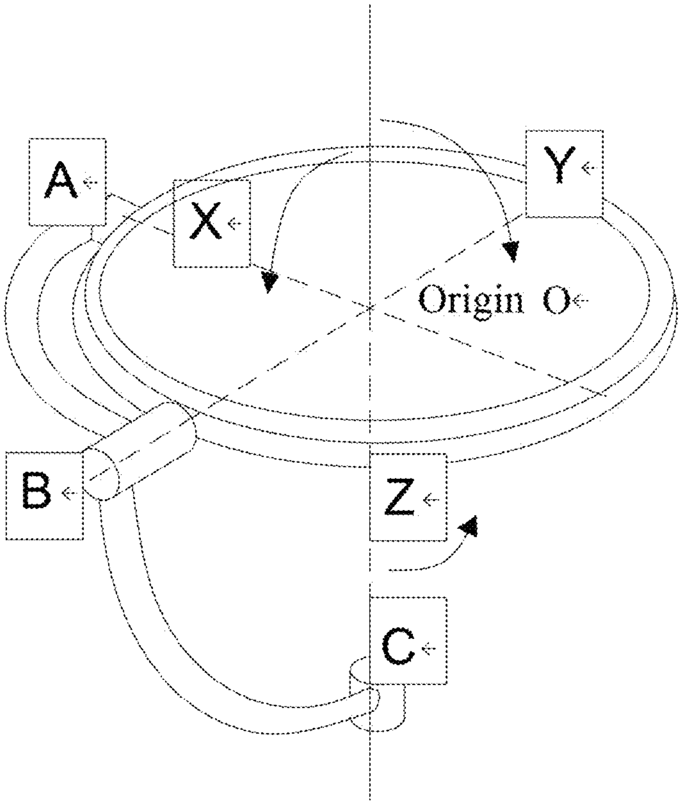
FIG. 19 is a structural schematic diagram of a traditional 90° orthogonal cardan joint.
Figure 20:
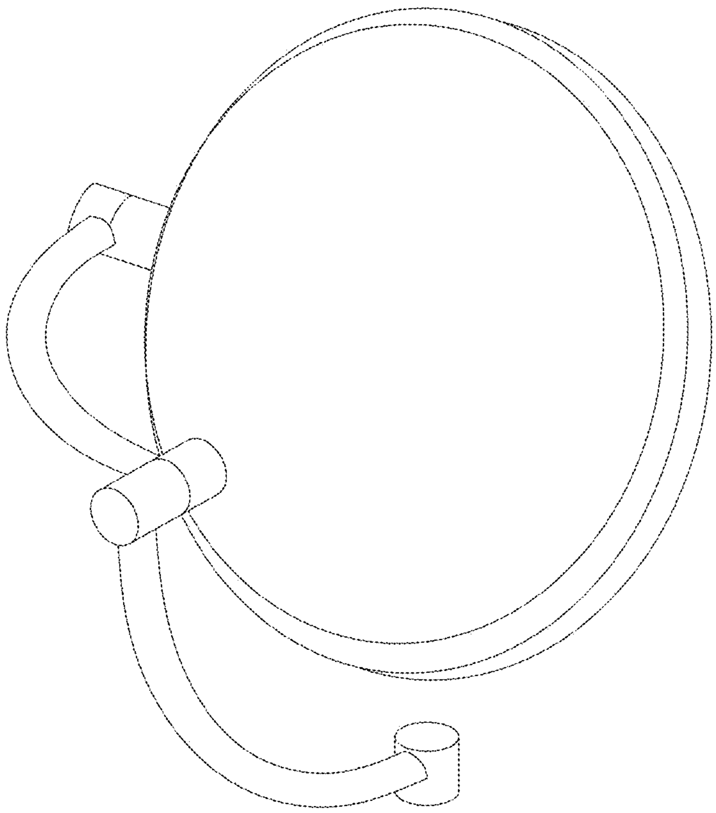
FIG. 20 is a schematic diagram of a field of view blocked by the traditional 90° orthogonal cardan joint.
Figure 21:
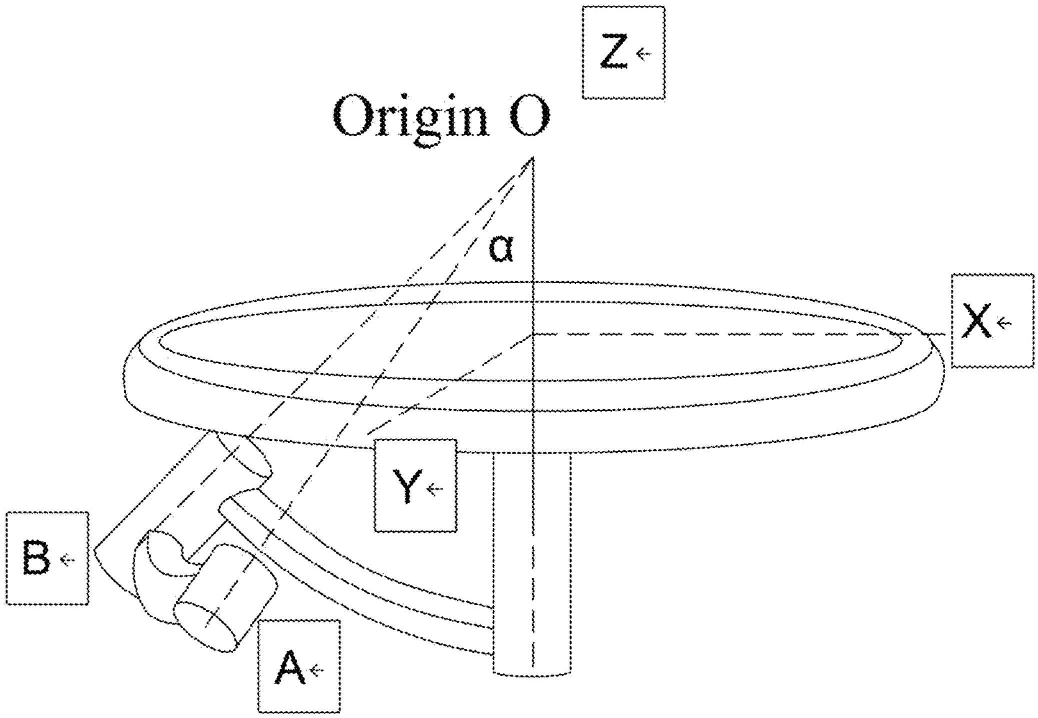
FIG. 21 is a structural schematic diagram of a non-orthogonal cardan joint with an angle of $\alpha$.
Figure 22A:
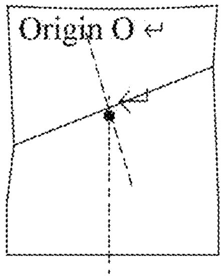
FIGS. 22A, 22B and 22C are schematic diagrams of the cardan joints in which a rotating unit is replaced with an arms and a joint.
Figure 22B:
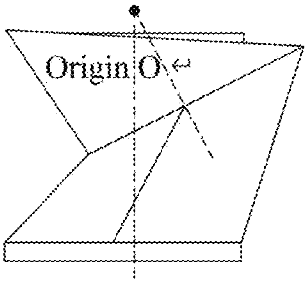
Figure 22C:
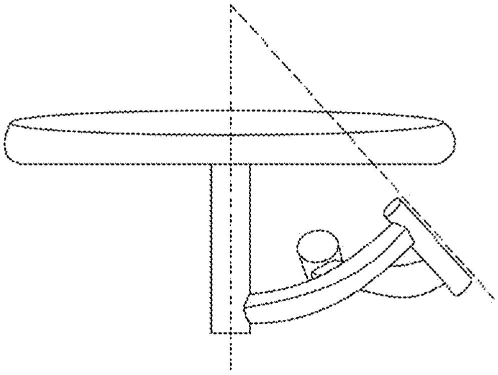

Next, referring to a similar schematic diagram FIG. 18, how to arrange the synchronous rotating device in the passive system is introduced.

In the passive system, the first connecting disc **100*f* does not have the rotational freedom, and the other end of the first connecting rod assembly 601 is directly connected with the second connecting disc 200*f*. That is, compared with the active system, the driving disc 800** is omitted in the passive system.

In the passive system, the rotary transmission disc 700 and the first connecting component **330*f* are still coaxially provided. Moreover, the rotary transmission disc 700 can rotate relative to the first component 310*f* and the second component 320*f*. The other end of the second connecting rod 602 is still connected with a rotating assembly 500*f*** through a ball joint.

In the description of the embodiments of the present disclosure, it needs to be understood that orientation or positional relationship indicated by the terms "perpendicular", "parallel", "upper", "lower", "front", "rear", "left", "right", "vertical", "horizontal", "top", "bottom", "inside", "outside" and the like is based on the orientation or positional relationship shown in the drawings only for convenience of description of the present disclosure and simplification of description rather than indicating or implying that the device or element referred to must have a particular orientation, be constructed and operate in a particular orientation, and thus are not to be construed as limiting the present disclosure. Furthermore, the terms "first" and "second" are used for descriptive purposes only and are not to be construed as indicating or implying relative importance or implying the number of the indicated technical features. Thus, the feature defined by "first" and "second" can explicitly or implicitly include one or more features. In the description of the present disclosure, "a plurality of" means two or more, unless otherwise specifically defined.

In the present disclosure, it should be noted that, unless expressly specified and limited otherwise, the terms "mounting", "connected" "connect" should be understood broadly, e.g., may be either a fixed connection or a detachable connection, or an integrated connection; may be either a mechanical connection or an electric connection; may be either a direct connection or an indirect connection through an intermediate medium; or may be the internal communication between two elements. For those of ordinary skill in the art, the specific meanings of the above-mentioned terms in the present disclosure can be understood on a case-by-case basis. The above is only the preferred embodiment of the present disclosure, and is not used to limit the present disclosure. Any modification, equivalent substitution, improvement, etc. made within the spirit and principle of the present disclosure should be included in the scope of protection of the present disclosure.

What is claimed is:

1. A motion system, comprising a first connecting disc, a second connecting disc, and a first motion module, a second motion module and a rotating assembly arranged between the first connecting disc and the second connecting disc;
- wherein the first motion module and the second motion module are oppositely arranged and are both connected with the rotating assembly;
- the first motion module comprises a first component and a second component which are connected with each other, two opposite ends of the first component are rotatably connected with the second connecting disc and one end of the second component, respectively, and one end, away from the first component, of the second component is rotatably connected with the rotating assembly;
- the second motion module comprises a third component and a fourth component which are connected with each other, two opposite ends of the third component are rotatably connected with the second connecting disc and one end of the fourth component, respectively, and one end, away from the third component, of the fourth component is rotatably connected with the rotating assembly;
- wherein the rotating assembly comprises a gear assembly and a first bearing assembly connected with each other;
- one end, away from the first component, of the second component is embedded inside the first bearing assembly; and
- one end, away from the third component, of the fourth component is sleeved outside the first bearing assembly and is connected with the gear assembly.

2. The motion system according to claim 1, wherein
- one end, away from the first component, of the second component is embedded inside the first bearing assembly and is abutted against the gear assembly; and
- one end, away from the third component, of the fourth component is sleeved outside the first bearing assembly and is abutted against the gear assembly.

3. The motion system according to claim 2, wherein the first bearing assembly comprises a first bearing, and a second bearing sleeved on an outer ring of the first bearing;
- one end, away from the first component, of the second component is embedded inside an inner ring of the first bearing;
- one end, away from the third component, of the fourth component is sleeved outside an outer ring of the second bearing.

4. The motion system according to claim 3, wherein the first connecting disc is connected with the outer ring of the first bearing and the inner ring of the second bearing.

5. The motion system according to claim 4, wherein the first motion module further comprises a first connecting mechanism; the first connecting mechanism comprises a second bearing assembly;
- one end, adjacent to the first component, of the second component is embedded inside the second bearing assembly; and
- one end, adjacent to the second component, of the first component is sleeved outside the second bearing assembly.

6. The motion system according to claim 5, wherein the first connecting mechanism further comprises a first elastic element which comprises a spring or a rubber block, and the first elastic element is arranged between the second component and the second bearing assembly.

7. The motion system according to claim 6, wherein the first motion module further comprises a second connecting mechanism; the second connecting mechanism comprises a third bearing assembly;

one end, away from the second component, of the first component is sleeved outside the third bearing assembly; and one end, adjacent to the first component, of the second connecting disc is embedded inside the third bearing assembly.

8. The motion system according to claim 7, wherein the second connecting mechanism further comprises a second elastic element, and the second elastic element is arranged between the second connecting disc and the third bearing assembly.

9. The motion system according to claim 8, wherein the second motion module further comprises a third connecting mechanism; the third connecting mechanism comprises a fourth bearing assembly;

one end, adjacent to the third component, of the fourth component is embedded inside the fourth bearing assembly; and one end, adjacent to the fourth component, of the third component is sleeved outside the fourth bearing assembly.

10. The motion system according to claim 9, wherein the second motion module further comprises a fourth connecting mechanism; the fourth connecting mechanism comprises a fifth bearing assembly;

one end, away from the fourth component, of the third component is sleeved outside the fifth bearing assembly; and one end, adjacent to the third component, of the second connecting disc is embedded inside the fifth bearing assembly.

11. The motion system according to claim 1, wherein the rotating assembly comprises an inner gear ring, a gear train meshed with the inner gear ring, and a connector;

the gear train is connected with the first bearing assembly through the connector; and the inner gear ring is fixedly connected with the fourth component.

12. The motion system according to claim 11, wherein the gear train comprises a center gear, and at least one planetary gear meshed with the center gear.

13. The motion system according to claim 1, further comprising a first connecting rod assembly, a second connecting rod assembly, and a rotary transmission disc;

a first rotating shaft, around which the first component and the second component rotate relative to each other, is coaxially disposed with the rotary transmission disc, and the rotary transmission disc is able to rotate relative to the first component and the second component;

one end of the first connecting rod assembly is connected with the rotary transmission disc through a first ball joint, and an other end of the first connecting rod assembly is controlled relative to a position of the rotating shaft between the first component and the second connecting disc; and one end of the second connecting rod assembly is connected with the rotary transmission disc through a second ball joint, and an other end of the second connecting rod assembly is connected with the second connecting disc through a third ball joint.

14. The motion system according to claim 13, further comprising a driving disc;

a second rotating shaft, around which the first component and the second-connecting disc rotate relative to each other, is coaxially disposed with the driving disc, the driving disc is able to rotate relative to the first component and the second connecting disc, and the driving disc is able to be controlled to rotate around a rotating shaft thereof.

15. The motion system according to claim 11, wherein the first bearing assembly comprises a first bearing, and a second bearing sleeved outside an outer ring of the first bearing;

one end, away from the first component, of the second component is embedded inside an inner ring of the first bearing;

one end, away from the third component, of the fourth component is sleeved outside an outer ring of the second bearing; and at least one gear in the gear train meshes with the outer ring of the first bearing and meshes with an inner ring of the second bearing through the connector.

16. The motion system according to claim 13, wherein the other end of the second connecting rod assembly is fixed to the second connecting disc.

17. The motion system according to claim 9, wherein the third connecting mechanism further comprises a third elastic element, and the third elastic element is arranged between the fourth component and the third bearing assembly.

18. The motion system according to claim 10, wherein the fourth connecting mechanism further comprises a fourth elastic element, and the fourth elastic element is arranged between the second connecting disc and the fifth bearing.

* * * * *